United States Patent
Pattee et al.

(10) Patent No.: US 6,912,427 B1
(45) Date of Patent: Jun. 28, 2005

(54) PROGRAMMABLE LIMIT SWITCH WITH DISTRIBUTED INTELLIGENCE

(75) Inventors: Jack Pattee, Davisburg, MI (US); Sheila F. Champagne, Troy, MI (US)

(73) Assignee: Ametek, Inc., Paoli, PA (US)

( * ) Notice: Subject to any disclaimer, the term of this patent is extended or adjusted under 35 U.S.C. 154(b) by 384 days.

(21) Appl. No.: 10/104,570

(22) Filed: Mar. 22, 2002

(51) Int. Cl.$^7$ .............................................. G05B 11/01
(52) U.S. Cl. ............................. 700/13; 700/9; 700/11; 700/12; 700/19; 700/20; 700/112; 700/228; 318/600; 318/601; 318/602; 318/603; 318/604; 318/605; 341/116
(58) Field of Search .............................. 700/11, 12, 13, 700/19, 112, 9, 20, 228; 318/600–605; 341/116

(56) References Cited

U.S. PATENT DOCUMENTS

| | | | | |
|---|---|---|---|---|
| 4,158,226 A | * | 6/1979 | Struger et al. ................. | 700/13 |
| 4,242,621 A | | 12/1980 | Spaulding | |
| 4,511,884 A | | 4/1985 | Serev et al. | |
| 4,835,676 A | * | 5/1989 | Kumar et al. ................. | 700/13 |
| 5,227,965 A | | 7/1993 | Klaes et al. | |
| 5,229,931 A | * | 7/1993 | Takeshima et al. ............ | 700/4 |
| 5,531,085 A | * | 7/1996 | Hayes ............................ | 72/43 |
| 5,621,398 A | * | 4/1997 | Blair et al. ............ | 340/870.36 |
| 5,771,174 A | | 6/1998 | Spinner et al. | |
| 5,984,498 A | | 11/1999 | Lem et al. | |
| 6,246,916 B1 | | 6/2001 | VonDerHaar et al. | |
| 6,257,136 B1 | * | 7/2001 | McCoy et al. ............. | 101/38.1 |

OTHER PUBLICATIONS

PressCam8. Installation & Operations Manual, Triad Controls, Inc. Rev. Feb. 1998.

* cited by examiner

*Primary Examiner*—Anthony Knight
*Assistant Examiner*—Douglas Shute
(74) *Attorney, Agent, or Firm*—Young & Basile, P.C.

(57) ABSTRACT

A programmable limit switch includes output channels for receiving position data, each position value of the position data representing an incremental advance of a workpiece through a production field, and for producing actuation signals. The channels are connectable to respective output devices responsive to the respective actuation signals and located in the field. Each output channel has an output controller, which is individually programmable to change the state of respective actuation signals in response to reaching selected position values. Preferably, the PLS includes input connectors coupled to a respective channel and connectable to respective input devices located within the production field. Each channel operates its own inputs and outputs according to a variety of programmed functions depending upon system conditions seen by the output controller.

35 Claims, 11 Drawing Sheets

```
⇒ CUSTOMIZE DISPLAY
  DEFINE SUPV PASSWORD
  DEFINE USER PASSWORD
  DEFINE TITLE SCREEN
  SET FAULT CLEAR OPTION
  ENABLE BRAKE INPUT
  LOCKOUT FUNCTIONS
  INITIALIZE SYSTEM
  INITIALIZE PROGRAM
  LABEL OUTPUTS
  LABEL INPUTS
  EXPANSION BOARDS
```

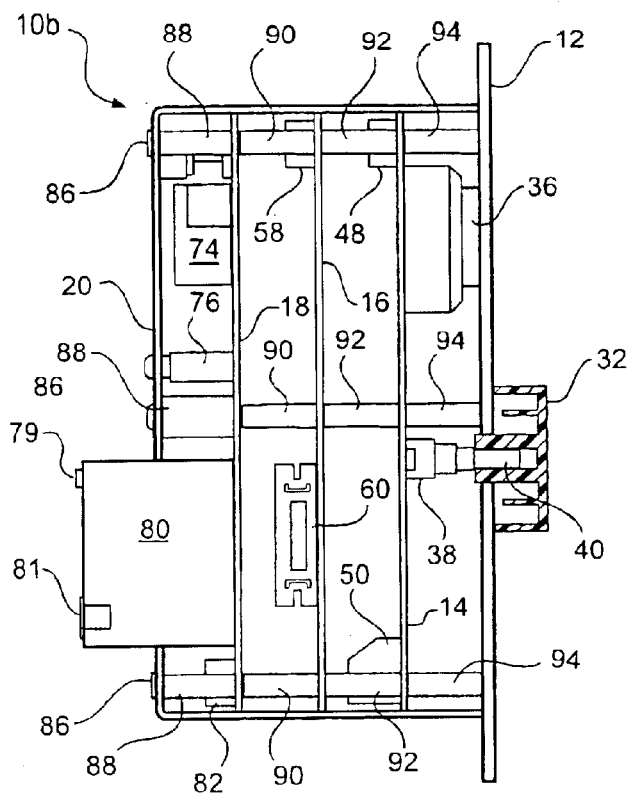
FIG - 10
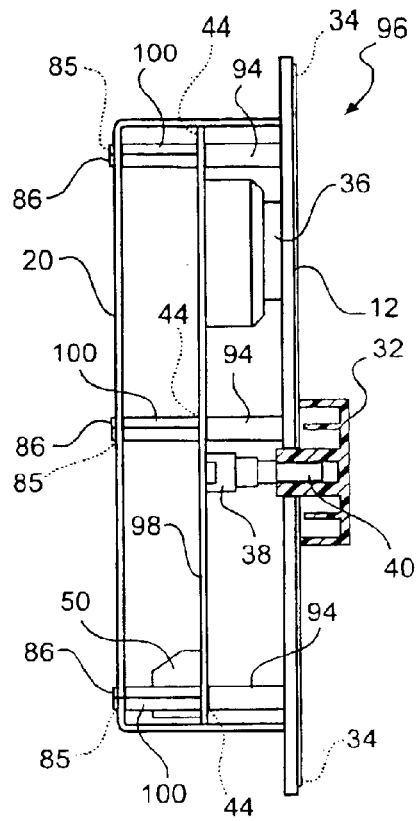
FIG - 11
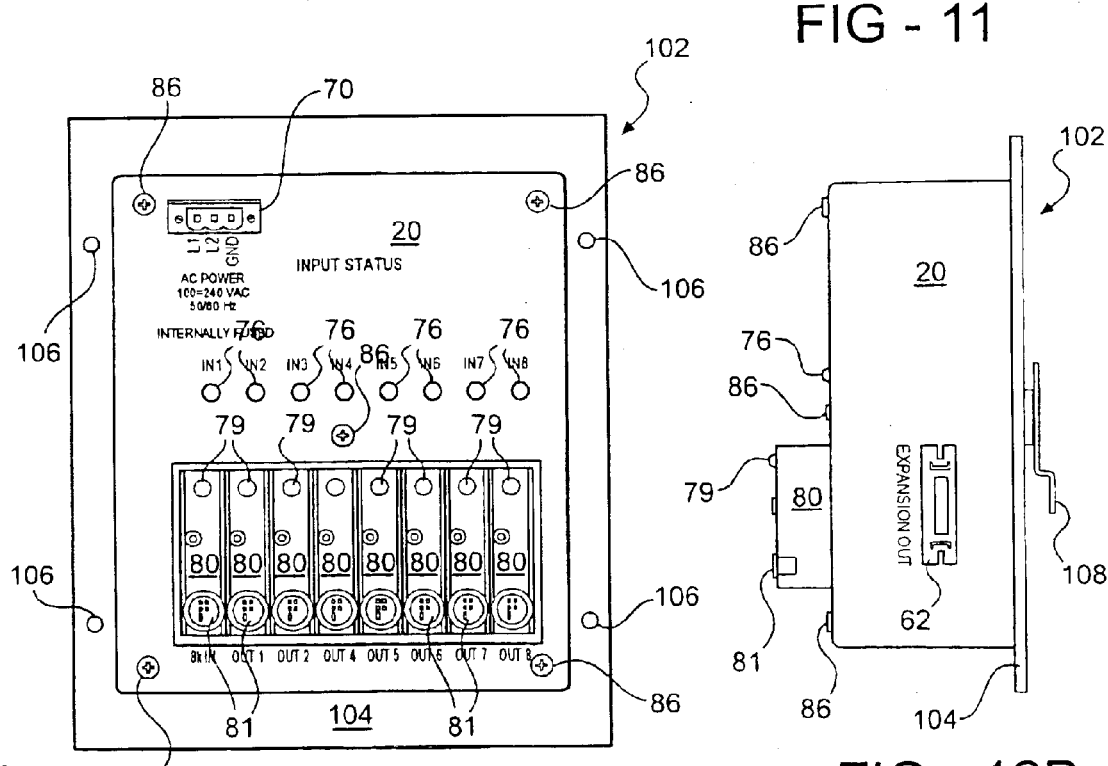
FIG - 12A
FIG - 12B

PROGRAMMABLE LIMIT SWITCH WITH DISTRIBUTED INTELLIGENCE

RELATED APPLICATIONS

This invention is related to simultaneously filed, co-pending application Ser. No. 10/104,563 entitled "AUTOMATIC ADDRESS SELECTION METHOD," the disclosure of which is incorporated herein in its entirety by reference.

BACKGROUND OF THE INVENTION

1. Field of the Invention

The present invention relates to programmable limit switches.

2. Description of the Related Art

In a variety of applications, many devices must be addressed by a central processing unit. For certain applications, addressing the devices in parallel is common. For example, a number of memory devices in computing applications are commonly addressed in parallel by a central processing unit. This parallel addressing requires a dedicated connection from the central processing unit to each memory device. Serial addressing is less common for many applications due to the problems associated with determining for which serially-connected device a signal from the central processing unit is intended. In such applications, a unique address is assigned to each device. In industrial applications, for example, commands to machines controlled by a central processing unit require each machine to be assigned a unique address by, for example, common dual in-line package (DIP) switches. The central processing unit is then programmed to signal each machine by including its unique address attached to a command for that machine. When new machines are added, it must be assigned a unique address and its unique address must be used in the additional programming required to integrate the machine into the system. This problem is illustrated in programmable limit switches.

Programmable limit switches are known and used in a variety of applications. Their most prevalent application is in the use of automated assembly systems, such as a system to assemble diapers. In such systems, the product is moved along a conveyor from workstation to workstation and at each workstation a particular process of the assembly occurs. In the diaper assembly system, for example, one workstation layers a section of absorbent material, while another seals the edges of the layered material. The position of a product in the assembly is monitored by, for example, a resolver connected to the conveyor. The resolver most commonly includes a shaft, which rotates as the conveyor moves products linearly, and circuit means, which detects the rotation of the shaft and sends short pulses to a programmable limit switch.

The programmable limit switch receives position data from a variety of means for measuring position, such as the resolver mentioned, and uses them to control an output device, such as a glue gun, according to pairs of setpoints designated for the output device. Setpoints indicate when an output device is to be turned on and off. An example best illustrates the use of a programmable limit switch. Diapers on the conveyor have a starting edge spaced a certain distance apart, represented by 100 counts of position data, and each extends a length measured by 20 counts. The programmable limit switch controls a glue gun, which needs to apply glue along the edge of each diaper, starting at the second half of the diaper, i.e., 10 counts into the length of the diaper. The programmable limit switch is programmed with a setpoint pair depending upon the starting position of the first product such that the glue gun starts to apply glue 10 counts into the length of each diaper and stops applying glue 20 counts into the length of each diaper. If, then, the starting edge of the first diaper is 50 counts along the conveyor, the pairs of setpoints for three diapers sequentially traveling through the area of glue gun operation are 60 and 70, 160 and 170, and 260 and 270. Thus, when a counter of the PLS reaches 60, for example, its output is activated, or switched on, applying glue beginning half way along the length of the first diaper. When the setpoint 70 is reached, the output is deactivated, or switched off, ending the application of glue at the end of the first diaper's edge. The diaper then proceeds toward the next workstation. The programmable limit switch continues to activate and deactivate the output circuit connected to the glue gun according to the pairs of setpoints for each of the remainder of the diapers along the conveyor.

Of course, a device controlled by the programmable limit switch, such as the glue gun described in the example, can have a constant delay from the time it receives an electrical signal to the time the desired mechanical action occurs. Consequently, an offset is needed so that the electrical signal triggers the device on or off prior to the desired action. The determination of what the offset should be is complicated by the fact that as the velocity of the mechanical system changes, the offset changes. This means that, as the speed of the mechanical system changes, a larger offset is required to compensate for the same mechanical delay. Another complication is that many mechanical devices require two offsets because the delay for activating the device is often different from the delay for deactivating the device.

Prior art devices usually implement the control of such an output in software using a microprocessor. Position signals are provided to the microprocessor, which calculates velocity from two positions at a fixed time interval. The microprocessor computes the offsets using the velocity and adds the offsets to the actual position. These two positions are compared to a table of on/off positions to determine whether a change in output state is performed. This microprocessor can control many output circuits driving output devices from one position reading, but cannot operate at high speeds or with many simultaneously-controlled output circuits without a significant degradation in performance.

These output circuits that drive output devices and are controlled by the microprocessor are generally located on multiple circuit boards, adding the complication that commands sent from the microprocessor must know to which of a plurality of typically identical circuit boards they are addressed. In the prior art, one means of addressing the circuit boards is through the use of DIP switches mounted on each circuit board. The DIP switches set a unique address on each board, which the microprocessor reads to determine whether the command is intended for an output circuit connected to that circuit board or one connected to another circuit board. Similar to the problems previously discussed, each circuit board requires a unique address in order for the microprocessor to distinguish between the boards. Thus, whenever a circuit board is added, a unique address must be set for each new board.

Further, as programmable limit switches incorporate more and more functions due to the inclusion of a more powerful microprocessor, operating such switches has become more complicated and involved, necessitating many hours to understand how to program the microprocessor to create even the simplest set of operating instructions.

SUMMARY OF THE INVENTION

The present invention is a programmable limit switch with distributed intelligence that is capable of controlling a large number of circuits simultaneously. The switch operates without performance degradation when the number of input and output circuits expands, even when operated at high speeds. The programmable limit switch (PLS) establishes a timing of events in a workpiece treatment process carried out as a workpiece traverses through a production field. The PLS includes a plurality of output channels for receiving position data where each position value of the position data represents an advance of the workpiece through the production field. The output channels are also used for producing device actuation signals, each of the plurality of output channels connectable to an output device responsive to the respective device actuation signals and located in the production field. An output controller is in each of the plurality of output channels and is individually programmable to change a state of the respective device actuation signals in response to reaching selected position values.

The PLS can also include a main programmable controller operable to execute an operating program including a plurality of functions, the operating program programming each of the output controllers. This embodiment can include means for entering data into the plurality of functions of the operating program.

Two modules of the PLS described herein, the remote interface and the stand-alone main controller, include an alphanumeric display for displaying data associated each of a plurality of functions of the operating program and means for scrolling the display through each of the plurality of functions. The scrolling means can be, for example, a scroll knob or one or more switches. The data associated with each of a plurality of functions of the operating program can include settings wherein the scrolling means scrolls the display through selectable changes to the settings. Then, at least one button is operable to enter changes to the settings.

In one embodiment of the invention, the output controller is programmable to receive the position data and produce output signals in accordance with an operating program, and each of the output channels further includes a relay for receiving the output signals and producing device actuation signals and an output connector connectable to the respective output device and receiving the device actuation signals from the relay. The relays can be a variety of solid-state or mechanical relays. The output controller of each output channel can be a microcontroller.

In another embodiment of the invention, a fault reset switch connector is operable to clear faults when a signal state of the switch connector toggles. This is only one way to clear faults, as hereinafter discussed.

The PLS can include a connector connectable to means for producing position inputs such as a resolver, encoder, etc., as discussed herein and can include means for transmitting the position inputs as position data to the plurality of output channels.

Various function are programmable into the plurality of output channels. For example, any number of the output controllers is programmable to change a state of a respective device actuation signal in response to a first position and to change the state again after a predetermined period of time. In addition, any number of the output controllers is programmable to change a state of a respective device actuation signal at an ON setpoint associated with a first position value and to change a state of the respective device actuation signal again at an OFF setpoint associated with a second position value, the ON and OFF setpoints defining a respective setpoint pair. Any of these standard channel outputs can be modified by programming it to add a first offset to the respective ON setpoint based upon a comparison of a base speed to an actual speed of travel determined from a sample number of position values and to add a second offset to the respective OFF setpoint based upon the comparison, providing linear speed compensation. When the actual speed of travel drops below a predetermined speed, an output controller so programmed can optionally de-energize a respective device actuation signal.

In another embodiment of the PLS, a brake input is operably connectable to a brake and one of the output controllers is programmable to start a counter when the brake input de-energizes and stop the counter when the output channel does not receive a change in position value. This can be used to, for example, detect an excessively long stop time of a machine in the system.

The PLS can be surrounded by a housing where the plurality of output channels are mounted on at least one circuit board within the housing. Optionally, a main programmable controller operable to execute an operating program is mounted within the housing, and the switch includes a connector for connecting to means for entering data into the operating program can each be mounted within the housing. The means for entering data into the operating program can be external to the housing in this embodiment.

In one embodiment of the PLS, the plurality of output channels are mounted on two or more expansion circuit boards, each expansion circuit board having an expansion in port and an expansion out port through which the two or more expansion circuit boards are serially connected. This allows flexible, modular design of the PLS. If the two or more expansion circuit boards are each enclosed within a separate housing and a main programmable controller is mounted within a first one of the housings, expansion of the number of output channels controllable by the PLS is possible.

The first one of the housings can further include a connector connectable to means for producing position inputs and means for transmitting the position inputs as position data to the plurality of output channels.

A variation of the embodiment of the PLS including the main programmable controller mounted within the first one of the housings also includes an alphanumeric display for displaying data associated each of a plurality of functions of the operating program, the display viewable through the first one of the housings, means for scrolling through and for changing the data on the alphanumeric display, the scrolling means mounted on the first one of the housings and at least one button operable to enter the changed data and mounted on the first one of the housings.

Where the two or more expansion circuit boards are each enclosed within a separate housing, the PLS can further include a plurality of input connectors for receiving device input signals and connectable to respective input devices located within the production field, each input connector coupled to a respective output channel and mounted on the respective housing.

In another embodiment of the PLS, one of the output controllers is programmable to change a state of a respective device actuation signal when a first sample of position data indicates a predetermined speed of travel through the production field and to change a state again if a second sample of position data indicates a speed of travel slower than the predetermined speed of travel.

Yet another embodiment of the PLS includes a plurality of input connectors for receiving device input signals and connectable to respective input devices located within the production field, each input connector coupled to a respective output channel. Optionally, at least one of the output controllers is programmable to change a state of a respective device actuation signal at an ON setpoint associated with a first position value and to change a state of the respective device actuation signal again at an OFF setpoint associated with a second position value, the ON and OFF setpoints defining a respective setpoint pair. Many variations using the a setpoint pair are possible.

For example, an output controller is programmable to ignore the setpoint pair unless a signal state of at least one of the respective plurality of input connectors changes in a period prior to the ON setpoint. Alternately, an output controller is programmable to change the state of the device actuation signal at the respective ON setpoint and to change the state of the device actuation signal again prior to the respective OFF setpoint if a signal state of a respective input connector changes between the ON setpoint and the OFF setpoint.

In yet another embodiment, at least one of the output controllers is programmable with a first dwell point and a second dwell point, the first and second dwell points defining a dwell window, and the at least one of the output controllers is programmable to indicate a fault when a signal state of a respective input connector either does or does not change within the dwell window. Alternately, an output controller programmed with a dwell window is programmable to indicate a fault when a signal state of a respective input connector changes after the first dwell point and changes state a second time prior to the second dwell point.

Another variation in the embodiment of the PLS including input connectors occurs when the PLS includes a connector connectable to means for producing position inputs and means for transmitting the position inputs as the position data to the plurality of output channels. At least one of the output controllers can include a counter and is programmable to reset the counter to a preset position value from which to start counting position values when a signal state of a respective input connector changes to a first state.

As taught herein, the PLS of the present invention allows high speed operations with minimal mechanical wear due to its electronic construction. This also allows adjustments to the settings of the switches to be performed when the PLS A is operating and easily allows multiple ON and OFF points for a single output limited only by memory and processor speed. Its modular design allows easy expansion and installation.

BRIEF DESCRIPTION OF THE DRAWING

The various features, advantages and other uses of the present invention will become more apparent by referring to the following detailed description and drawing in which;

FIG. 10 is a roughly cross-sectional view of the stand-alone main controller module according to the present invention;

FIG. 11 is a roughly cross-sectional view of a remote operator interface module according to the present invention;

FIG. 12A is a plan view of an expansion module according to the present invention;

FIG. 12B is a side view of the expansion module according to the embodiment shown in FIG. 12A;

DETAILED DESCRIPTION

Figure 1:
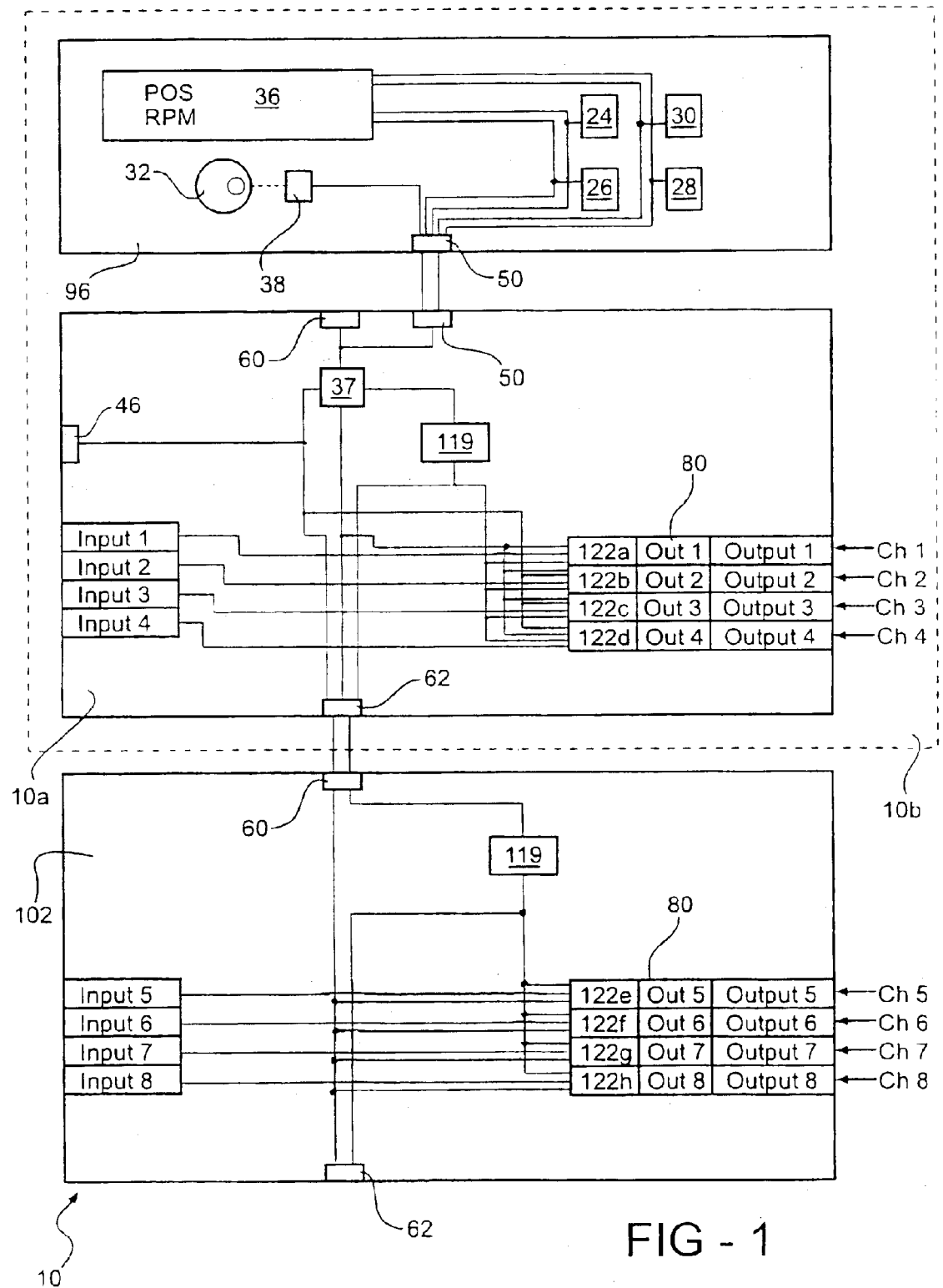
FIG. 1 is a simplified block diagram of certain modules of the programmable limit switch according to the present invention.

The programmable limit switch incorporating the present invention is shown and described with reference to FIGS. 1–18. FIG. 1 shows a block diagram of certain modules of the programmable limit switch (PLS) 10 incorporated into a portion of a system with eight input connectors. Inputs 1–8 internally tied to eight output circuits, or channels, Ch 1–8, respectively. The input connectors. Inputs 1–8 and output channels. Ch 1–8 are split evenly between a blind main controller 10a and an expansion module 102, which are two modules of the PLS 10. Thus, input connectors. Inputs 1–4 and output channels. Ch 1–4 are mounted on the blind main controller 10a, while input connectors. Inputs 5–8 and output channels. Ch 5–8 are mounted on the expansion module 102. Although the four input connectors and four output channels are incorporated into the embodiments shown, eight input connectors and output channels on each of the blind main controller 10a and the expansion module 102 are preferred.

A remote operator interface module, or remote interface, 96 of the PLS 10 is connected to the blind main controller 10a through a cable connected to a remote display port 50 mounted on each. The remote interface 96 shown includes a display 36, four programming switches in the form of buttons or keys 24, 26, 28, 30 and a rotary, or scroll, knob 32 controlling a selector 38. These components of the remote interface 96 perform two functions: first, they allow the user to select and edit the operating program of the main microcontroller 37, discussed hereinafter; and second, during operation of the programmable limit switch, the display 36 can also receive and display information from the main microcontroller 37 regarding certain system conditions and parameters. These components of the remote interface 96, and their functions, are discussed in further detail hereinafter.

Returning now to the blind main controller 10a and the expansion module 102, their input connectors. Inputs 1–9 are each connectable to an input device associated with a process, or system, in which a PLS 10 is incorporated, such as the diaper assembly system previously mentioned. Many types of hardware can drive. Inputs 1–8, including mechanical switches, relay contacts, DC three-wire sensors, three-wire proximity sensors, solid-state DC output modules and programmable logic controller DC outputs. By example to FIG. 2, the input devices are photosensors 210, 212, 214. Inputs 1–8 are preferably tied to eight output channels. Ch 1–8, respectively. More specifically, Inputs 1–8 are each hardwired to eight output microcontrollers 122a–h, respectively, one each incorporated into channels. Ch 1–8. Although the output controllers 122a–h are preferably 8-bit microcontrollers, and are called output microcontrollers 122a–h, it will be clear that the channels. Ch 1–8 can instead incorporate a microprocessor coupled to memory. In addition, the channels. Ch 1–8 can instead incorporate logic circuits to accomplish all or some of the functions needed, but this is more complicated and requires additional space over either the microprocessor or microcontroller design.

In addition to each of the output channels. Ch 1–8 including an output microcontroller 122a–h, each also includes an output connector. Output 1–8 connected to the output microcontroller 122a–h, respectively, through a solid-state AC or DC output relay 80 (OUT 1–8). Of course, a mechanical output relay 80 can also be used. Each one of Outputs 1–8 is connectable to an output device of the system in which the PLS 10 is incorporated. Each output connector. Output 1–8 can energize a solenoid, relay, solid-state circuitry or another load controlling respective output devices. Each relay OUT 1–8 is a depluggable relay 80 chosen by the user based upon the characteristics of the load to which its respective. Output 1–8 is connected. Referring to the example in FIG. 2, the output devices are glue guns 216, 218, 220.

A device indicating the position of workpieces traversing along the system in which the PLS 10 is incorporated is connectable to the blind main controller 10a through a position connector 46. This position sensor device can be any type of position sensor including a rotary encoder, a magnetostrictive linear displacement transducer or one or more analog position input device interfaces. Another possible position sensor device connectable to the position connector 46 is a resolver, mentioned previously. By example, a resolver 208 is used as the position sensor device shown in FIG. 2. Whatever position sensor device is used, additional circuitry, not shown but standard in the art, can be included in the PLS 10, if necessary, to receive the signals from the position connector 46 and convert the signals to digital signals, also called position values or counts, for input into a main microcontroller 37 and the output microcontrollers 122a–h of the output channels Ch 1–8. For example, the resolver 208 shown in FIG. 2 produces two analog ratiometric voltages, which must be fed through a resolver-to-digital converter (R/D converter) (not shown).

As the resolver 208 rotates over one revolution or cycle, the R/D converter counts sequentially up to its resolution, transmitting raw position data to the main microcontroller 37 and the output microcontrollers 122a–h. For example, a 12-bit R/D converter counts from 0–4095, defining one cycle of the resolver 208, and starts again at zero. These counts are called raw position values or counts hereinafter.

A scale factor programmed into the main microcontroller 37 provides the ability to display the raw position values in a meaningful way. If, for example, a scale factor of 360 is programmed, the main microcontroller 37 can provide on the display 36 a count from 0–359 while it receives raw position values from the position sensor device, such as the raw position counts 0–4095 received from the resolver 208 through the R/D converter.

An operating program of the main microcontroller 37 programs the microcontrollers 122a–h with certain program commands, which instruct each microcontroller 122a–h as to what conditions must exist for it to send energizing, or enabling, and de-energizing, or disabling, signals to its respective. Output 1–8 during each cycle of the position sensor device. Such program commands include, for example, an ON setpoint indicating when to enable a connected output device and an OFF setpoint indicating when to disable the device, the ON and OFF setpoints defined by desired position values as seen by the output microcontrollers 122a–h. To program the blind main controller 10a, the main microcontroller 37 sends a series of data lines, each associated with an address signal. Select logic 119, discussed in more detail hereinafter, uses the address signal to selectively write the data to the appropriate microcontroller 122a–d. These signals are sent from the main microcontroller 37 upon a start up of the PLS 10 or upon a change in the operating program during operation of the PLS 10.

Programming similarly proceeds when the PLS 10 incorporates an expansion module 102. The blind main controller 10a and the expansion module 102 each contain an expansion in port 60 and an expansion out port 62. These ports 60, 62 provide a means for the main microcontroller 37 to communicate with one or more expansion modules 102. As mentioned with respect to the blind main controller 10a, a series of data lines, each associated with an address signal, originate from the main microcontroller 37 in response to an operating program. With the addition of one or more expansion modules 102 to the PLS 10, the select logic 119 of the blind main controller 10a first determines whether one of its output microcontrollers 122a–d is being addressed and, if so, which one. If one of its microcontrollers 122a–d is addressed, the data contained in the data lines, or signals, are written to the appropriate address of the microcontroller 122a–d, as indicated by the address lines, or signals.

Regardless of whether one of the output microcontrollers 122a–d is addressed, the blind main controller 10a passes the address lines from its expansion out port 62 to the expansion in port 60 of the expansion module 102. The select logic 119 of the expansion module 102 receives the address lines and determines whether one of its microcontrollers 122e–h is being addressed and, if so, which one. If the select logic 119 of the expansion module 102 determines that one of its microcontrollers 122e–h is addressed, the data contained in the data lines is written to the appropriate address of the microcontroller 122e–h, as indicated by the address lines. If another expansion module 102 were connected in series with the expansion module 102 shown, the address signals would pass out the expansion out port 62 and into the expansion in port 60 of the second expansion module 102 to its select logic 119, and so on, regardless of whether any of the microcontrollers of the previous module were addressed. In theory, an unlimited number of expansion modules 102 can be serially connected to one blind main controller 10a, or a stand-alone main controller 10b, discussed herein. However, as discussed in more detail hereinafter, practical restrictions make it preferred that no more than seven expansion modules 102 are so connected.

During operation, the main microcontroller 37 and output microcontrollers 122a–h continuously receive digital signals from the position connector 46, whether directly or through some analog-to-digital conversion circuitry as previously discussed. The main microcontroller 37 can also write new data to one or all of the microcontrollers 122a–h during operation by passing the relevant data along in a data line associated with an address signal. The signals pass through the expansion out port 62 of the blind main controller 10a and the expansion in port 60 of the expansion module 102 to each output microcontroller 122e–h. Each output microcontroller 122a–h can also receive device input signals from one of Inputs 1–8 during operation. In response to all of these signals, each output microcontroller 122a–h selectively sends enabling and disabling signals through its respective output connector, Output 1–8.

Also during operation, the main microcontroller 37 can issue operating commands requesting information from any one or all of the output microcontrollers 122a–h. For example, the main microcontroller 37 could query the status of a particular input such as Input 4. The main microcontroller 37 does this by sending a read signal with an address signal for the output microcontroller to be queried along the serial connection between the modules, as previously discussed. The address signals from the main microcontroller 37 proceed through the expansion out port 62 of the blind main controller 10a and the expansion in port 60 of the expansion module 102 to the intended output microcontroller(s). Once an intended output microcontroller is addressed, data lines containing the requested information travel back to the blind main controller 10a through the appropriate expansion in port(s) 60 and expansion out port(s) 62.

Figures 2, 16:
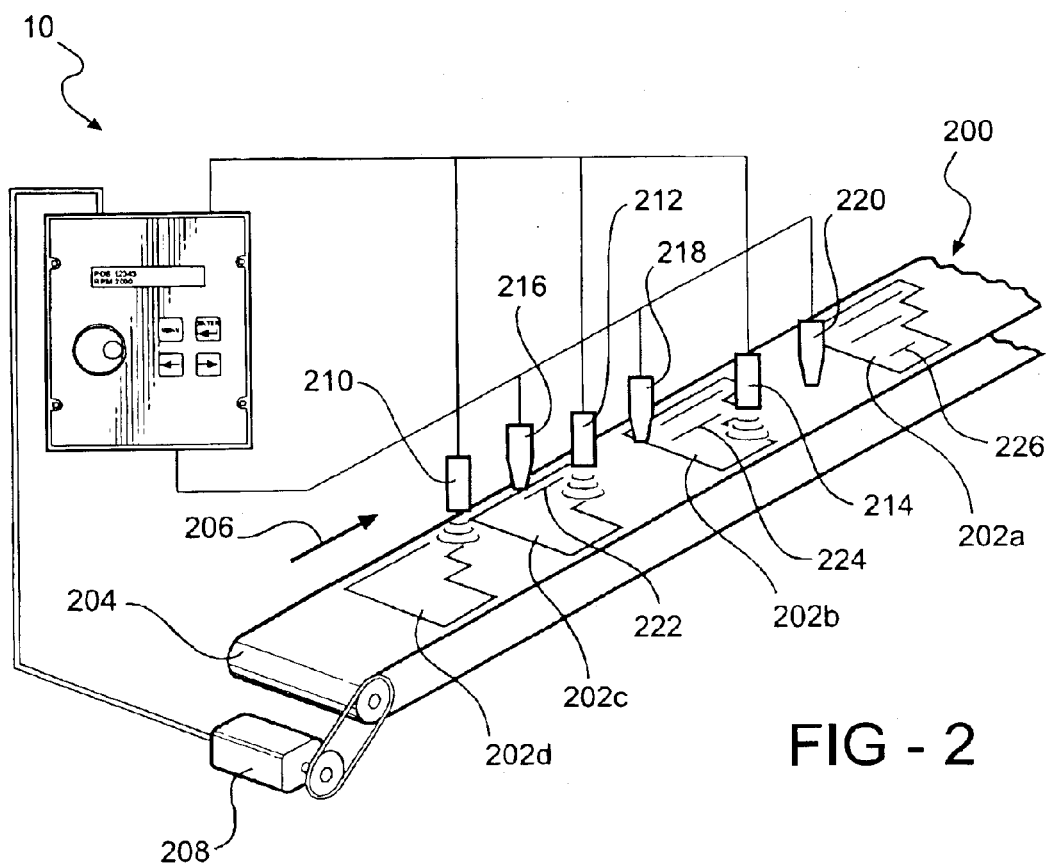
FIG. 2 is a pictorial representation of one embodiment of the programmable limit switch incorporated into a system including three inputs and outputs.
FIG. 16 shows the scrolling supervisor menu according to the present invention.

A simple example of an application for the PLS 10 is illustrated in FIG. 2. As shown in FIG. 1, the components of the blind main controller 10a and the remote interface 96 previously discussed can be combined into one module of the PLS 10, a stand-alone main controller 10b. FIG. 2 incorporates this stand-alone main controller 10b into one workstation, or production field, of a system 200 where products 202a–d proceed along a conveyor belt 204 in the direction indicated by the arrow 206. Glue beads 222, 224 and 226 are applied to the surface of each of the products 202a–d in turn before the products are sent on to another workstation. As the conveyor belt 204 moves, the resolver 208 sends signals to the stand-alone main controller 10b. The resolver 208 is ideally coupled to the conveyor belt 204 at a 1:1 ratio such that one resolver shaft rotation corresponds to one cycle of the machine operating the conveyor belt 204. The programmed scale factor marks one resolver shaft rotation, or resolver cycle. As the scale factor of the PLS 10 can be any engineering unit, one useful way to program the scale factor occurs when one rotation of the resolver represents one product moving through a single point in the production field. In that case, the length of the product can be programmed as the scale factor, and the setpoints can be programmed based upon where they should operate an output device along the length of the product.

In this example, Inputs 1–3 are connected to the photosensors 210, 212, 214, which each detect the starting edge of the products 202a–d as the conveyor belt 204 proceeds in the direction of the arrow 206. The glue guns 216, 218, 220, apply glue beads 222, 224, 226, respectively, to each of the products 202a–d in turn. Although not shown, each glue gun 216, 218, 220 has a source of glue. The glue guns 216, 218 and 220 are connected to Outputs 1–3, respectively. Thus, in this simple example, photosensor 210 is tied to an output microcontroller 122a, which controls glue gun 216, photosensor 212 is tied to an output microcontroller 122b, which controls glue gun 218, and photosensor 214 is tied to an output microcontroller 122c, which controls glue gun 220.

Upon a start up, the operating program of the main microcontroller 37 programs the output microcontrollers 122a–c according to program commands. Programming of the output microcontrollers is discussed in further detail hereinafter. For this example, it is sufficient to realize that the program commands instruct each output microcontroller 122a–c when to enable and disable its respective glue gun 216, 218, 220 based upon device input signals and position values developed from the raw position counts. In operation, when the photosensor 210 senses the first product 202a, the output microcontroller 122a sees the state of Input 1 change from, for example, low to high. The output microcontroller 122a reads raw position counts until the position value it sees reaches a programmed ON setpoint. The microcontroller 122a then signals its output relay OUT 1, enabling Output 1 to activate the glue gun 216, which starts the application of glue bead 222. The output microcontroller 122a continues to read raw position counts. When the position value seen by the output microcontroller 122a reaches a programmed OFF setpoint, the output microcontroller 122a stops signaling OUT 1, disabling Output 1 and deactivating the glue gun 216.

One of skill in the art recognizes that the state of Input 1 as seen by the output microcontroller 122a changes once again when the photosensor 210 no longer detects the presence of the first product 202a. That is, in our example, a change in state from high to low is seen for Input 1 at some point during the application of the glue bead 222 or after the OFF setpoint is reached. This change in state is not relevant to the operation of the output microcontroller 122a here. Specifically, the output microcontroller 122a in this example is programmed with one setpoint pair, that is, one ON setpoint and one OFF setpoint per cycle of the resolver 208. After the output microcontroller 122a operates according to its setpoint pair, the output microcontroller 122a rests until it senses a change in state of Input 1 from low to high, which occurs when the photosensor 210 detects the second product 202b. The microcontroller 122a monitors raw position counts, enabling Output 1 when its position value reaches the ON setpoint and disabling Output 1 when its position value reaches the OFF setpoint. The output microcontroller 122a again waits for the next change in state of Input 1 from low to high indicating the starting edge of the third product 202c, and so on. Each time the output microcontroller 122a detects a change of state of Input 1 from low to high, it calculates an offset, which is added to the raw resolver position to obtain its internal position value to compare against the ON/OFF setpoints for Output 1. The offset is obtained by subtracting the raw resolver position from a desired preset position at the time of reset.

For example, assume that the length of each product 202 is 10.0 cm, and the first glue bead 222 starts at 1.5 cm and ends at 8.0 cm along that length. If the scale factor is 10.0, each count produced by the R/D converter represents 10/4096 cm. Stated another way, for every 409.6 counts, the product 202 travels 1 cm. If the distance between the photosensor 210 and the glue gun 216 is 4.0 cm, it would be useful to program the output microcontroller 112a such that the change in state detected by the photosensor 210 indicating the starting edge of each product 202 results in a position value of 0.0 seen by the output microcontroller 122a as the glue gun 216 reaches the starting edge of each product 202. As the raw position count continues, the position value increases until the ON setpoint of 1.5*409.6= 614.4 is reached. After the OFF setpoint of 8.0*409.6= 3276.8 is reached for the first product 202a, the output microcontroller 122a continues to receive raw position counts up to 4095, starting again at zero, and does not react to the position values it sees until the photosensor 210 detects the leading edge of the second product 202b. Then, the output microcontroller 122a starts this sequence again for the glue gun 216 with respect to product 202b by applying the calculated offset to the raw position counts received. This continues for the remainder of the products 202c and 202d. Output microcontrollers 122b and 122c similarly control the operation of the glue guns 218 and 220 with respect to the same products 202a–d.

As seen from this description, the main microcontroller 37 provides input signals to the output microcontroller 122a, while the output microcontroller 122a of output channel Ch 1 performs all of the monitoring for and control of Output 1. This makes the PLS of the present invention able to operate at relatively high speeds compared to prior art devices. This benefit is even more pronounced when multiple inputs and outputs are controlled. Here, for example, as the first glue bead 222 is being applied to the third product 202c, the second photosensor 212 is detecting the leading edge of the third product 202c, and the third photosensor 214 is detecting the leading edge of the second product 202b. Although only one resolver 208 is used, each output microcontroller 122a–c keeps track of the position of its own position value with respect to the raw position counts and keeps track of the status of its own input and output, as discussed with respect to the output microcontroller 122a, minimizing processor delays in operating the system 200.

In this example, the photosensors 210, 212 and 214 are used because the spacing of the products 202 along the conveyor belt 204 is non-uniform, such that setting ON and OFF setpoints assuming a spacing would lead to incorrect application of the glue beads 222, 224, 226. Here, the output microcontroller 122a, and the other output microcontrollers 122b and 122c are each programmed to determine their respective internal position values using an offset obtained by subtracting the raw position count from a desired preset position value at the time of reset, that is, each time the photosensors 210, 212, 214 detect the leading edge of a product 202. Each input is thus said to be programmed as a reset-to-preset single shot mode input, which is merely one programmable input configuration available in the present invention. If the spacing of the products 202 is uniform, the photosensors 210, 212, 214 are not necessary, and setpoint pairs corresponding to the known spacing of the products 202 are programmed into the microcontrollers 122a–c. Inputs 1–3 are thus disabled by programming their associated microcontroller 122a–c in no input mode, which is another input configuration available in the present invention. No input mode causes the microcontroller so programmed to ignore any activity from its input connector. Thus, the associated output would continuously enable and disable its associated device based upon its programmed setpoints and the raw position data from the position sensor device, such as the resolver 208.

However Inputs 1–3 are used or not used, the output channels Ch 1–3 are programmable according to more than one configuration. As described above, for example, the output microcontrollers 122a–c operate Outputs 1–3 as standard channel outputs. A standard channel output is an output channel where the output microcontroller sends an enabling signal to the output connector at a programmed ON setpoint, turning the associated output device such as glue gun 220 on, and sending a disabling signal to the output connector at a programmed OFF setpoint, turning the glue gun 220 off. Alternatively, one or more microcontrollers 122a–c can operate its respective Output 1–3 as a linear speed channel. A linear speed channel is an output configuration where the microcontroller 122 programming includes linear speed compensation advancing or retarding the programmed setpoints depending upon the speed of the conveyor 206 of the system 200, which compensates for the mechanical lag in the glue guns 216, 218, 220. These and other input and output configurations are discussed in further detail hereinafter.

The flexibility of the PLS 10 of the present invention is apparent even from the simple example presented. First, theoretically, any number of setpoint pairs can operate over one cycle of the resolver 204. Practical considerations due to memory limitations and processor speeds, however, limit the number of setpoint pairs to a preferred number of six per output channel. Second, any number of input and output devices can theoretically be controlled by adding additional expansion modules 102 to the PLS 10, although practical considerations hereinafter discussed limit the number of inputs and outputs to a preferred number of no more than 64 inputs and 64 outputs. Third, any one input device, such as that connected to Input 1, can control more than one output device by tying Input 1 to the inputs corresponding to the controlled outputs since each input is internally tied to its corresponding output channel. Fourth, any of Inputs 1–8 and Outputs 1–8 can be disabled or not connected to a device for use of the PLS 10 in a small system. Other advantages will be apparent from the remainder of the description.

As mentioned, various modules of the PLS 10 are contemplated herein, the blind main controller 10a, the remote interface 96, the stand-alone main controller 10b and the expansion module 102. Each of these modules are discussed in detail herein. However, as the stand-alone main controller 10b includes all of the same components of the other modules, the stand-alone main controller 10b is generally used to describe the PLS 10. Differences between the stand-alone main controller 10b and the other modules are explained where necessary. For simplicity, where a description applies equally to both the stand-alone main controller 10b and the blind main controller 10a, the text refers to the main controller 10a/b.

Figure 3:
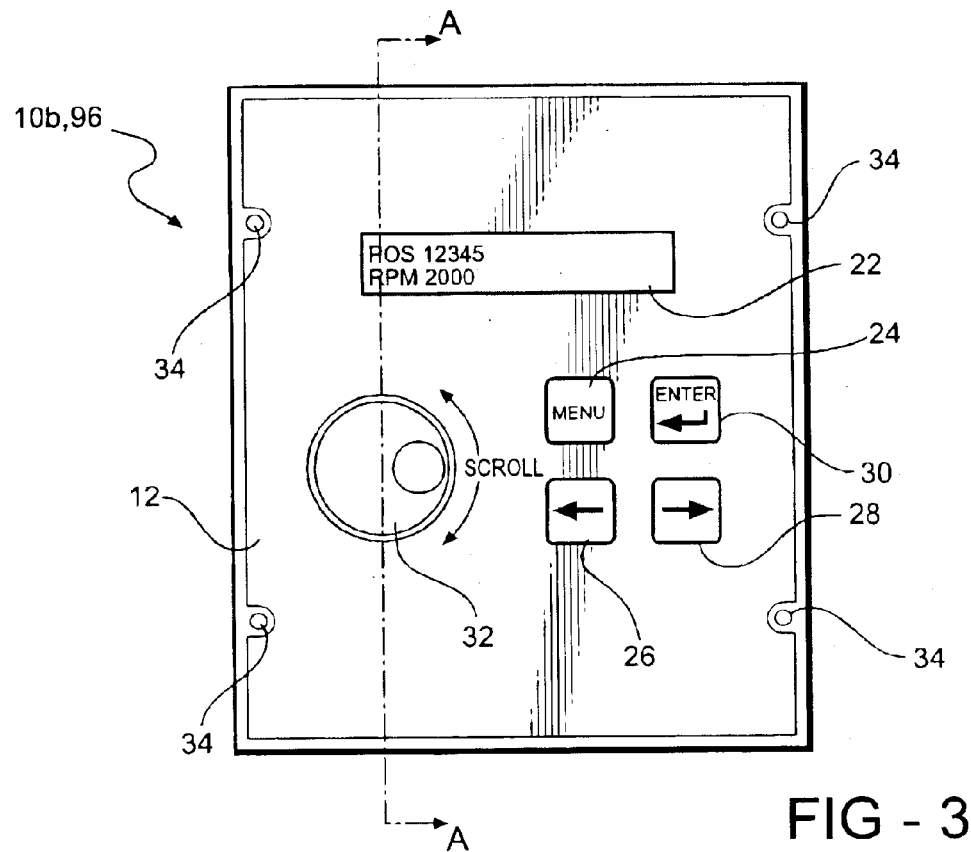
FIG. 3 is a plan view of the stand-alone main controller and remote interface modules of the programmable limit switch of the present invention.

In the embodiment illustrated herein, the stand-alone main controller 10b includes a front faceplate 12, a motherboard 14, an expansion board 16, and an output board 18, all enclosed by a back housing 20. FIG. 3 depicts the front faceplate 12, common to both the stand-alone main controller 10b and the remote interface 96. The faceplate 12 provides protection for the components of the module in which it is incorporated. The unique menu-driven alphanumeric display 36 allows the user to select and edit functions of the PLS 10. The MENU key 24 accesses the menu-driven displays through which the user enters data. The scroll knob 32 moves the user through the menu-driven displays and through alphanumeric characters shown through the display window 22. The left arrow key 26 and the right arrow key 28 move a cursor in the display window 22 left and right, respectively. The ENTER key 30, when pressed, completes entry of data for the screen displayed in the display window 22. Other configurations for the components of the faceplate 12 and programming of the PLS 10 using these components of the faceplate 12 are discussed in further detail hereinafter.

The faceplate 12 is preferably made of a durable metal with apertures 34 formed in the surface for mounting the module, whether the stand-alone main controller 10b or the remote interface 96. The remainder of the components of the stand-alone main controller 10b are attached to projections 94 in the rear of the faceplate 12, as shown and described in reference to FIG. 10. Preferably, a thin, protective sheet is mounted on the front faceplate 12 to protect the keys 24, 26, 28 and 30. A transparent or opaque portion forms the display window 22, through which the display 36 is seen. The module 10b, 96 is mounted using screws projecting through the apertures 34 and extending into a panel, for example, such that the front faceplate 94 is visible at one side of the mounting surface. Because, however, the stand-alone main controller 10b has both input LEDs 76 and output LEDs 79 visible through its back housing 20, as described herein, the stand-alone main controller 10b is preferably mounted such that the back housing is visible at the other side of the mounting surface. One common mounting surface is the door of a panel.

Figure 4A:
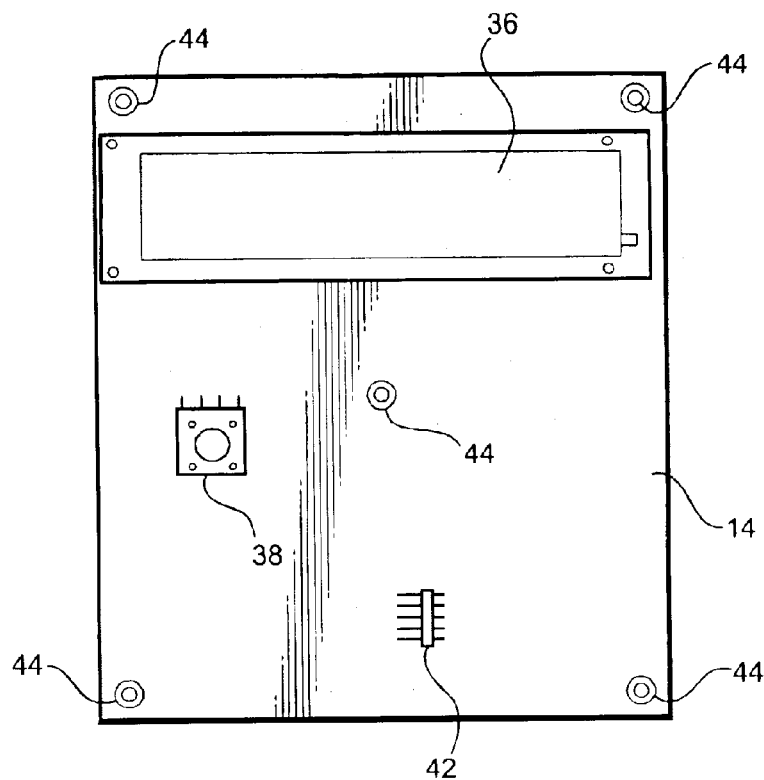
FIG. 4A is a pictorial representation of the front side of a motherboard according to one embodiment of the present invention.
Figure 4B:
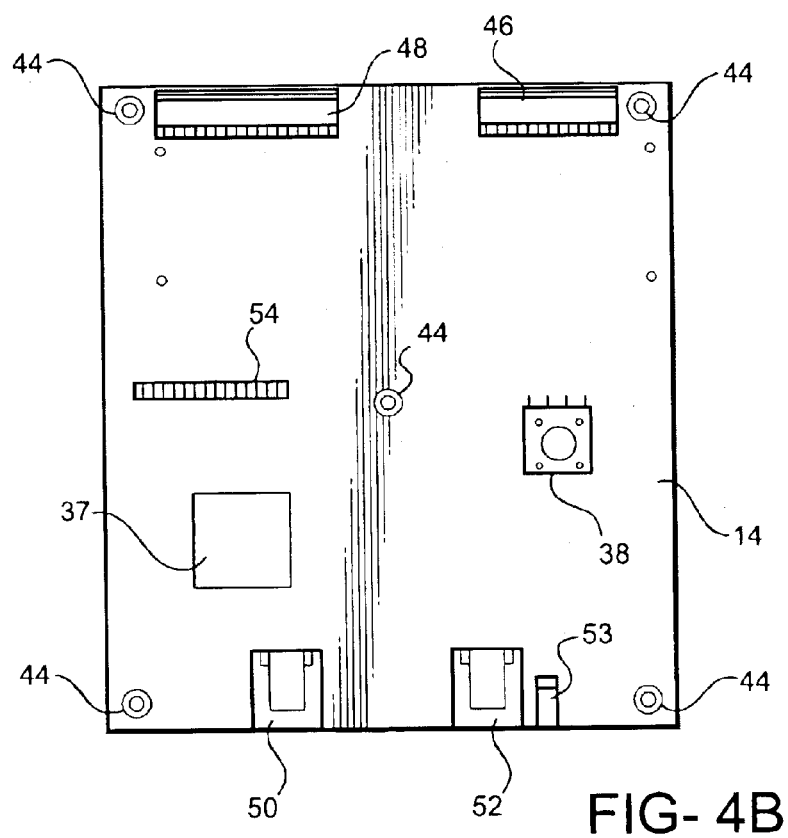
FIG. 4B is a pictorial representation of the rear side of the motherboard of FIG. 4A.

The display 36 is any standard alphanumeric display accepting digital inputs but is preferably an alphanumeric vacuum fluorescent display mounted on the motherboard 14, shown in FIGS. 4A and 4B. For illustrative purposes, FIG. 4A is referred to as the front view of the motherboard 14, while FIG. 4B is referred to as the rear view. The motherboard 14 is a standard printed circuit board onto which the main microcontroller 37 is mounted. Alternatively, of course, a central processing unit or microprocessor with memory can be incorporated in place of the main microcontroller 37. The selector 38 is mounted through the motherboard 14, and the scroll knob 32 is rotatably mounted to the selector 38 by a selector shaft 40 (shown in FIG. 10) projecting through the front faceplate 12. The main microcontroller 37 sends signals to the display 36 in response to inputs from the selector 38 based upon rotation of the scroll knob 32. Signals from the keys 24, 26, 28, 30 are transmitted to the motherboard 14 through a signal connector 42 electrically connecting the faceplate 12 to the motherboard 14. Apertures 44 through the motherboard 14 provide a means for mechanically coupling the motherboard 14 to the faceplate 12 and the remainder of the stand-alone main controller 10b.

Figure 5:
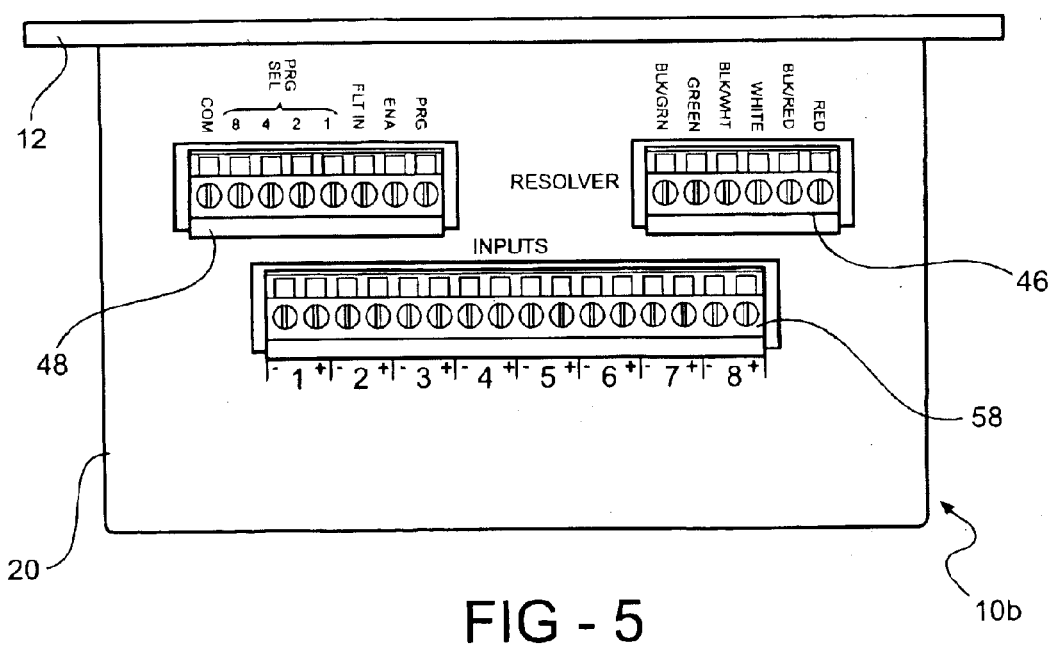
FIG. 5 is a top view of the programmable limit switch according to the embodiment shown in FIG. 4A.

FIG. 4B is a rear view of the motherboard 14, which shows several connectors and ports, including a program connector 48, a user port 52, a motherboard interconnect 54, and the position connector 46 and remote display port 50 previously discussed. The position connector 46 and the program connector 48 are shown in FIG. 5. The position connector 46 shown provides a standard six-position connector for the ratiometric signals a resolver sends to the PLS 10, as previously discussed. However, alternate position connectors 46 are possible based upon the position sensor device to which the PLS 10 is connected, whether a different type of resolver, a rotary encoder, a magnetostrictive linear displacement transducer, etc. The program connector 48 is discussed herein with the discussion of the programming of the PLS 00.

Figure 6:
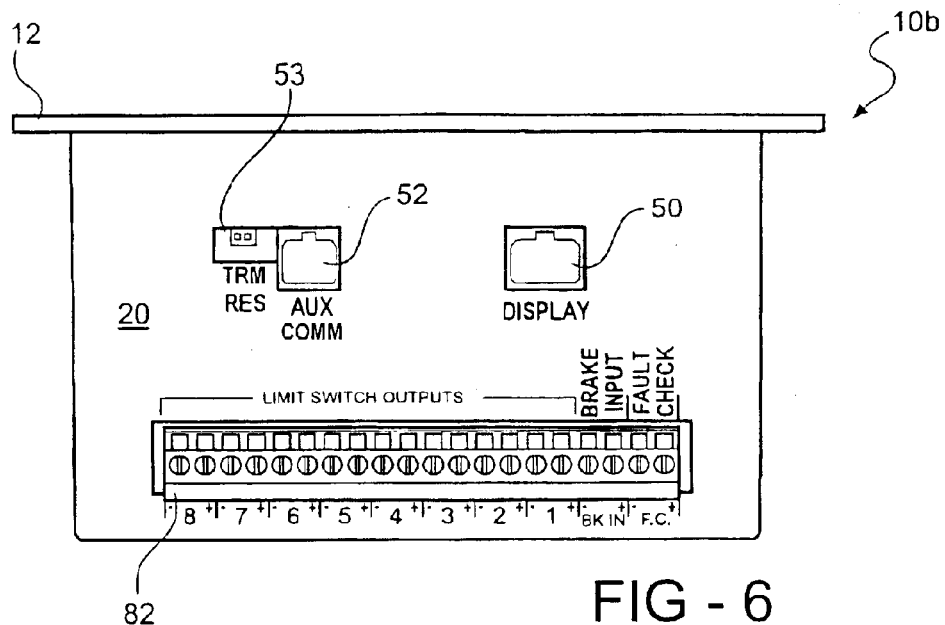
FIG. 6 is a bottom view of the programmable limit switch according to the embodiment shown in FIG. 4A.
Figure 9:
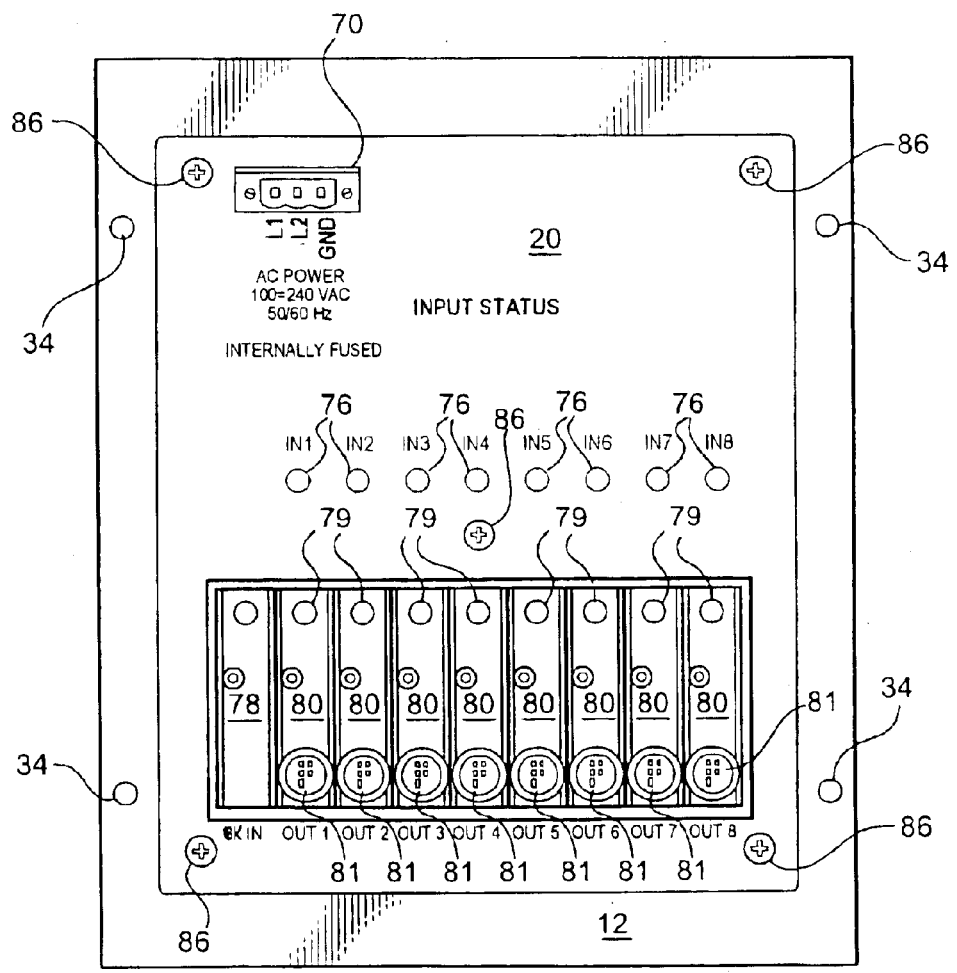
FIG. 9 is a rear view of an assembled programmable limit switch according to the embodiment shown in FIG. 4A.

The remote display port 50 provides a port to connect the remote interface 96 previously discussed to the motherboard 14. The remote interface 96 is shown and discussed in more detail with reference to FIG. 11. The remote interface 96 is not generally used with the stand-alone main controller 10b, but is instead preferably used with the blind main controller 10a; therefore, the remote display port 50 is optionally omitted from the stand-alone main controller 10b. Another port mounted on the motherboard 14 and shown in FIG. 41 is the user port 52, which is a serial connector accepting a standard RJ11 connector. Together with a termination resistor jumper 53, the user port 52 operates according to a standard communications interface, such as RS485, allowing the communication of the motherboard 14 with, by example, a standard personal computer (not shown) through which data input can be accomplished without utilizing the programming keys 24, 26, 28, 30 shown in FIG. 3. The remote display port 50 (DISPLAY), user port 52 (AUX COMM) and jumper 53 (TRM RES) are shown in FIG. 6, which is a view of the bottom of the stand-alone main controller 10b.

FIG. 4B also shows the motherboard interconnect 54, of the motherboard 14. Through a connection to a second motherboard interconnect 56 on the expansion board 16, inputs to and outputs from the motherboard 14 are communicated to the remainder of the main controller 10a/b. The second motherboard interconnect 56 projects through to the rear side of the expansion board 16, shown in FIGS. 7 and 13A–B. The expansion board 16, like the motherboard 14, is also a printed circuit board. An input connector 58 is mounted on the expansion board 16, which, when connected, receives inputs from various input devices of the system in which the PLS 10 is incorporated. For example, one input provided through the input connector 58 can be a signal from a photosensor as described in the example. Of course, the actual inputs provided through the input connector 58 depend upon the system in which the PLS 10 is incorporated.

In the embodiment shown in FIG. 5, the input connector 58 is a sixteen-position connector 58. The individual input connectors, Inputs 1–8, are each two-pin connectors connectable to up to eight input devices. Each is optically isolated and internally tied, or possibly hardwired, to one of eight output channels Ch 1–8, respectively, and specifically to one of eight output microcontrollers 122a–h of one of the respective channels Ch 1–8. The input connectors Input 1–8 are each configurable in one of a variety of ways through the operating program function INPUT CONFIGURATION; three are discussed herein, a reset-to-preset input, an output enable input or a die protection input. A no input mode, as described previously, is also available through the function INPUT CONFIGURATION. How this and other functions mentioned herein are accessed and programmed is discussed with the programming of the PLS 10 hereinafter.

The reset-to-preset input configuration has been previously discussed in the example as being particularly desirable where parts are randomly spaced as they enter an individual workstation within a system. A photoelectric or proximity switch senses the leading edge of the product regardless of the position value of the output microcontroller. Upon the receipt of the input signal representing the leading edge, the corresponding output channel, specifically its output microcontroller, calculates an offset based on a desired reset position and applies that offset to the raw position values in order to determine internal position values from which to operate based on its ON/OFF setpoint pairs. There are two modes of operation for the reset inputs, continuous mode and reset-to-preset single shot mode. In continuous mode, the selected output channel resets as described, then operates according to its ON/OFF setpoints as the microcontroller continues to receive raw position values. In single shot mode, the setpoint pairs operate for one complete cycle of the position sensor device, reaching a count of 4095 according to the resolver example provided, then the output channel de-energizes until the PLS 10 senses the next reset input, even if the internal position value of the output microcontroller again reaches an ON setpoint.

An output enable input is a configuration that enables or disables a device connected to output connector Output 1–8 based upon sensing a critical event prior to or during each cycle of the position sensor device. With the resolver as an example, each cycle is one rotation of the resolver through the counts 0–4095. One typical application is the verification that a product is present at a workstation prior to enabling the output connector and operating an output device. There are also two modes of operation for the output enable inputs, one shot and level. In an output enable one shot input, the user programs a window for the output microcontroller in which the tied input must change state to allow the output microcontroller to send enabling and disabling signals to its output connector over the current cycle of the position sensor device. If the change in input state is sensed within the window, the output channel operates according to its ON/OFF setpoint pairs. If the change is not sensed in the window, the output channel does not receive an enabling signal for that cycle of the position sensor device. An output enable level input operates like a simple AND input. The output microcontroller only operates its output as long as both the input is energized and the ON setpoint is reached. If the input is de-energized before the OFF setpoint is reached, the output microcontroller de-energizes the output connector.

Finally, a die protection input is a specialized configuration typically used in the stamping industry to protect dies from damage as a part progresses through each die. Damage can result from mis-sequencing or material buildup. The main microcontroller 37 programs an output microcontroller with ON/OFF points (defining a dwell period) similar to the setpoint pairs that operate an output channel. An input connector receives signals from a sensor mounted on or near the die. If the input connector does not change state within the dwell period, an output connector receives an enabling signal. If wired to do so, the enabled output connector operates to stop the press. The die protection inputs are programmable in one of three modes, momentary, partial revolution constant monitor or maintain.

An output microcontroller programmed with a die protection input in momentary mode needs only to sense a change in the state of its tied input connector once while the resolver is within the dwell period. If the state does not change during the period, the associated output connector receives an enabling signal. For example, a sensor detects the ejection of a part from a press. When the sensor detects the ejection of the part during the dwell period, the output connector does not receive an enabling signal. If, however, the sensor does not detect the ejection of a part during the dwell period, the associated limit switch output receives an enabling signal, indicating a fault.

In the partial revolution constant monitor mode of a die protection input, the output microcontroller monitors an input connector over the dwell period. The state of the input connector must remain energized during the entire programmed window, or the output microcontroller sends an enabling signal to its output connector. Finally, the maintain mode of the die protection input indicates a fault when the input connector energizes at some point in the dwell period but does not continue in that state to the end of the period. This function is particularly useful to detect a short feed of material into a press by monitoring for the presence of the material until the end of the dwell period.

Figure 7:
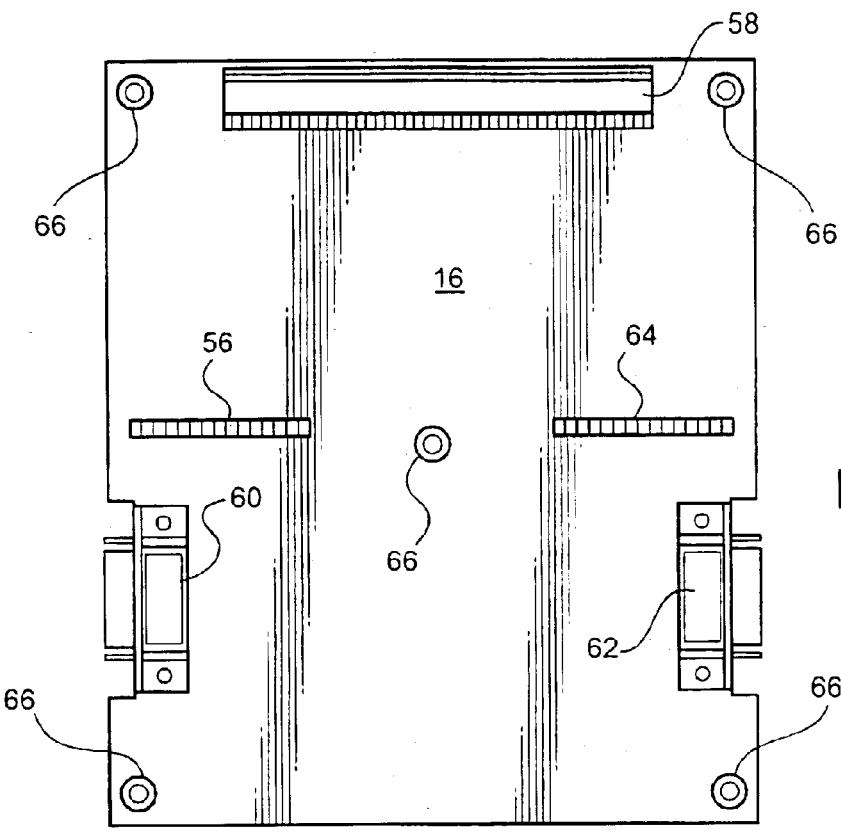
FIG. 7 is a partial pictorial representation of the rear side of the expansion board according to the present invention.
Figure 8:
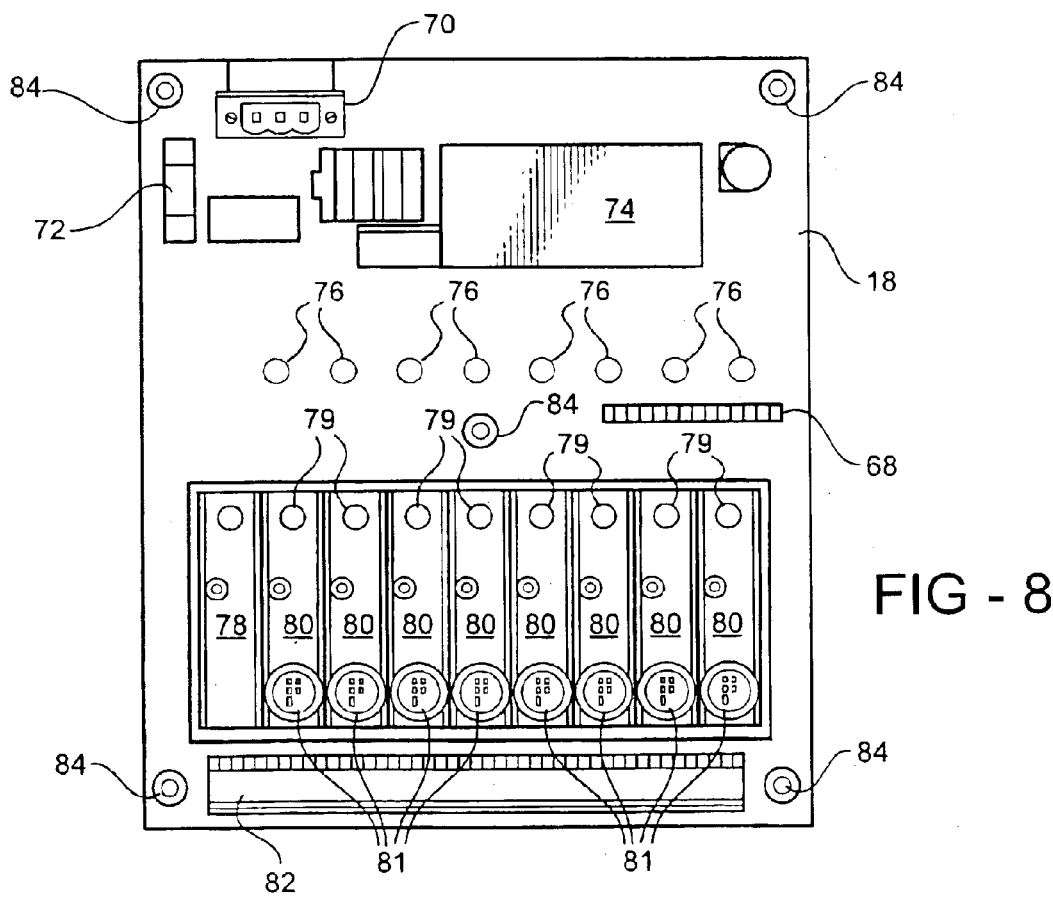
FIG. 8 is a pictorial representation of the rear side of an output board according to the embodiment shown in FIG. 4A.

FIG. 7 shows the expansion in port 60 and expansion out port 62 mounted on either side of the expansion board 16. As mentioned briefly earlier in the example, these ports 60, 62 are connections for standard bus connectors allowing the serial interconnection of a main controller 10a/b to an expansion module 102, specifically to an expansion board 16 located in the expansion module 102. The ports 60, 62 also allow the serial interconnection of an expansion board 16 of one expansion module 102 to the expansion board 16 of a second expansion module 102. A board interconnect 64 is mounted on the expansion board 16 to connect the expansion board 16 to the output board 18, which is shown in FIG. 8. As with the motherboard 14, the expansion board 16 has apertures 66, which line up with the apertures 44, to mechanically mount the expansion board 16 to the remainder of the components of the stand-alone main controller 10b. The remainder of the expansion board 16 is described hereinafter with reference to FIGS. 13A–B.

FIG. 8 shows the rear side of the output board 18. The output board 18 connects to the board interconnect 64 of the expansion board 16 through a second board interconnect 68 projecting through the output board 18. The output board 18 also carries a universal power supply for the main controller 10a/b. The power supply includes a power connector 70 accepting input power for the main controller 10a/b from a power source (not shown). Preferably, a standard fuse 72 provides a means of isolating the power connector 70 from the power source. A power supply 74 is a standard power converter that receives the input power from the power connector 70 and converts it to an operating voltage for the main controller 10a/b. For example, the power connector 70 can receive standard input power of 110–240 volts AC at 50 or 60 Hz. Standard operating voltages are typically 3 or 5 volts DC.

Input LEDs 76 (IN1–IN8) provide a visible indicator of the status of the eight isolated DC input connectors Input 1–8. As mentioned, each input connector Input 1–8 is optically isolated and tied to one of eight output channels Ch 1–8, respectively, and each output channel Ch 1–8 comprises an output microcontroller 122a–h, an output relay 80 (OUT 1–8) and a limit switch output connector Output 1–8. The output microcontrollers 122a–h are mounted on the expansion board 16, as discussed herein, but the output relays 80 and Outputs 1–8 are mounted on the output board 18.

The output relays OUT1–OUT8 shown are solid-state AC or DC output relays 80, but can be any combination of solid-state and/or mechanical relays. Each output relay 80 is a depluggable relay with an output status LED 79 indicating the state of the output connector connected to the relay 80. Each of the relays 80 also has a relay output fuse 81 providing a means to isolate the PLS 10 from the output devices of the system. As mentioned, which relay is chosen depends upon the load device to which its respective output connector is connected. In addition to the output relays 80, an optional brake monitor input relay 78 is included on the output board 18 of the main controller 10a/b. The brake monitor input relay 78 is discussed in further detail hereinafter with reference to the programming of the PLS 00.

A 20-pin output connector 82 is mounted on the output board 18 and is shown in FIG. 6. Four pins of the output connector 82 are associated with an optional brake monitor input (BK IN) associated with the optional brake monitor input relay 78 and an optional fault check relay output (F.C.), also discussed hereinafter with reference to the programming of the PLS 10. The remaining sixteen pins of the output connector 82 correspond to the eight limit switch output connectors, Outputs 1–8. The output relays 80 supply signals to output devices in the system in which the PLS 10 is incorporated, such as a glue gun, through Outputs 1–8. The operating program of the main microcontroller 37 programs each of the output microcontrollers 122a–h such that channels Ch 1–8, and consequently their associated Outputs 1–8, are said to be configured as either a standard, a time-based, or a linear speed channel. Of course, other output configurations are possible. One output channel optionally operates its output connector as a motion detect output.

As discussed previously, an output microcontroller in a standard channel output enables a device connected to an output connector at an ON setpoint position and disables the device connected to the output connector at an OFF setpoint position. The SETPOINT DATA function of the operating program of the PLS 10 programs the setpoint position values into the output microcontrollers. In an output channel programmed as a time-based output by the TIME-BASED OUTPUTS function of the operating program, the ON setpoint of the output microcontroller is a programmed position value. The output microcontroller then sends a disabling signal to the output connector after a programmed time duration passes. Output devices requiring a fixed amount of time to perform a task include, for example, lubricators, air blow-off limits and pneumatic cylinders.

Alternately, the user uses the LINEAR SPEED COMPENSATION function to configure an output channel as a linear speed channel. As previously described, a linear speed channel has linear speed compensation wherein its output microcontroller 122 advances or retards the programmed setpoints depending upon the speed of the system in which the PLS 10 is incorporated. Linear speed compensation thus compensates for the mechanical lag in output devices such as glue guns and other actuators that must be precisely synchronized with the position of a workpiece moving through a workstation of the system. A linear speed channel compensates for speed changes through the programming of both an ON offset and an OFF offset. The ON offset is a programmed rate of change that advances the enablement, or energization, of the device connected to the output connector earlier than the ON setpoint as the speed of the position sensor device increases and later than the ON setpoint as the speed of the position sensor device decreases. Similarly, the OFF offset is a separate programmed rate of change that advances the disablement, or de-energization, of the device connected to the output connector earlier than the OFF setpoint as the speed of the position sensor device increases and later than the OFF setpoint as the speed of the position sensor device decreases. The speed of the workpiece through the workstation can be calculated by the output microcontroller itself, or calculated by the main microcontroller 37 and written to the output microcontroller using a write command discussed herein.

One output channel is optionally controlled as a motion detect output by its output microcontroller. Programmed using the MOTION DETECT function of the PLS 10, an output connector energizes upon its output microcontroller reaching a programmed speed (usually in RPM) and de-energizes when the speed drops below a predetermined value. The user typically uses this feature to latch in operation of a device associated with the system when a desired operating speed is reached. When the output connector energizes, for example, the addition of products to a conveyor belt starts. This feature can also be used to detect a broken coupling or chain driving the resolver or other position sensor device.

As is shown in FIG. 8, the output board 18 has apertures 84 through which mechanical coupling of the output board 18 to the remainder of the stand-alone main controller 10b occurs. The back housing 20 surrounds and encloses the stand-alone main controller 10b. The back housing 20 has cutouts so that the power connector 70, the input LEDs 76, the brake monitor input relay 78 and output relays 80 extend through the surface of the back housing 20. Openings are also provided for the expansion in port 60 and the expansion out port 62. As shown in FIG. 10, the back housing 20 also has openings allowing external connections to the position connector 46, program connector 48, remote display port 50, user port 52, input connector 58 and output connector 82.

FIG. 10 shows a cross-sectional view of a fully constructed stand-alone main controller 10b through the reference line A—A of FIG. 3. As more clearly seen in this view, the machine screws 86 extend through apertures in the back housing 20, screwing into the female ends of a first set of standoffs 88. The first set of standoffs have male screw ends extending through the apertures 84 in the output board 18 and screwing into the female ends of a second set of standoffs 90. The male ends of the second set of standoffs 90 extend through the apertures 66 in the expansion board 16 and screw into the female ends of a third set of standoffs 92. The male screw ends of the third set of standoffs 92 extend through the apertures 44 of the motherboard 14 and screw into annular projections 94 extending from the rear of the faceplate 12.

The stand-alone main controller 10b shown in FIG. 10 is a stand-alone module, capable of controlling up to eight inputs and outputs without any of the other modules of the PLS 10. As can be seen from the foregoing description, one major advantage to the PLS 10 of the present invention is that it minimizes the cost and complexity of operating a large system through its modular design; the circuit boards described are either easily modified, or not modified at all, for use in the other modules. Further, one module of the PLS 10 is easily coupled to another to obtain additional benefits over solely using the stand-alone main controller 10b.

This is illustrated by the remote interface 96 of the PLS 10, a cross-sectional view of which through the reference line A—A of FIG. 3 is shown in FIG. 11. It includes only a faceplate 12 coupled to a circuit board 98 on which a display 36, a selector 38, a connector 42 and a remote display port 50 are mounted. Machine screws 86 extend through apertures 85 in a smaller back housing 20 and screw into female ends of a set of standoffs 100. The male ends of the standoffs 100 extend through apertures 44 in the circuit board 98 and screw into the annular projections 94 extending from the rear of the faceplate 12. The remote interface 96 is panel mountable at a distance from the main controller 10a/b using screws inserted through the apertures 34. The remote interface 96 is connected through its remote display port 50 by a cable, such as an 8-pin RJ45 cable, to the remote display port 50 mounted on the motherboard 14 of a main controller 10a/b.

The remote interface 96 allows inputs from the keys 24, 26, 28, 30 and the scroll knob 32 to be input remotely where, for example, the stand-alone main controller 10b is located in an inconvenient location. These inputs reach the motherboard 14 through the remote display port 50, instead of being received at the motherboard 14 from the selector 38 and connector 42 mounted on the motherboard 14. A more preferred embodiment of the PLS 10 occurs by using the remote interface 96 with the blind main controller 10a instead of the stand-alone main controller 10b when the stand-alone main controller 10b is mounted in an inconvenient location. Since the blind main controller 10a includes only a motherboard 14, an expansion board 16 and an output board 18, the user realizes a reduction in cost over using the remote interface 96 with the stand-alone main controller 10b due to the elimination of the display 36 from the motherboard 14 and the extra faceplate 12, along with all of its components. The blind main controller 10a, like the expansion module 102 discussed next, mounts such that the output relays 80 are visible to a user facing the mounting surface.

A particularly desirable feature of the present invention is the ability to use one or more expansion modules 102 with either the blind main controller 10a or the stand-alone main controller 10b. The expansion module 102 allows an expansion of the number of inputs and outputs controlled by the PLS 10 over using the main controller 10a/b alone. The expansion module 102 is programmed by the faceplate 12 and is controlled by the motherboard 14 of the main controller 10a/b. Thus, in an expansion module 102, although the expansion board 16 and the output board 18 are included, neither the faceplate 12 nor the motherboard 14 is included. Also omitted are the brake monitor input relay 78, its associated brake input BK IN and the fault check relay output (F.C.), as only the main controller 10a/b optionally includes these components. The expansion module 102 is shown in FIGS. 12A and 12B.

As with the blind main controller 10a, the expansion module 102 mounts in one of two different ways. Screws can panel mount the expansion module 102 through apertures 106 in a flat housing 104 protecting the PLS 10 in conjunction with the rear housing 20. This configuration, although not shown for the blind main controller 10a, can also panel mount the blind main controller 10a. The housing 104 includes annular projections like those projections of the rear of the faceplate 12, through which the housing 104 is secured to the remainder of the module, whether the blind main controller 10a or the expansion module 102. The blind main controller 10a and the expansion module 102 can also be DIN-rail mounted by the addition of a mounting bracket 108 to the side of the module facing towards the mounting surface, like the mounting bracket 108 shown in FIG. 12B on the expansion module 102.

The expansion module 102 expands the standard eight inputs and eight outputs of the main controller 10a/b, in groups of eight, to a theoretically unlimited number of inputs and outputs. In practice, however, no more than 64 inputs and 64 outputs are preferred. Since only one motherboard 14 carrying one main microcontroller 37 programs and signals these serially-arranged expansion boards 16, at least three problems are presented. One is signal degradation as the signals pass from the motherboard 14 to the expansion module(s) 102 and back. Another is specificity, i.e., there must be a way for the signals to address the expansion board 16 for which they are intended, but ignore the expansion boards 16 for which they are not intended. Finally, the PLS 10 must operate these multiple inputs and outputs with no decrease in update time. The unique expansion board 16 shown in FIGS. 13A–B and the unique scheme used to address the components of the board 16 address all of these problems.

Figure 13A:
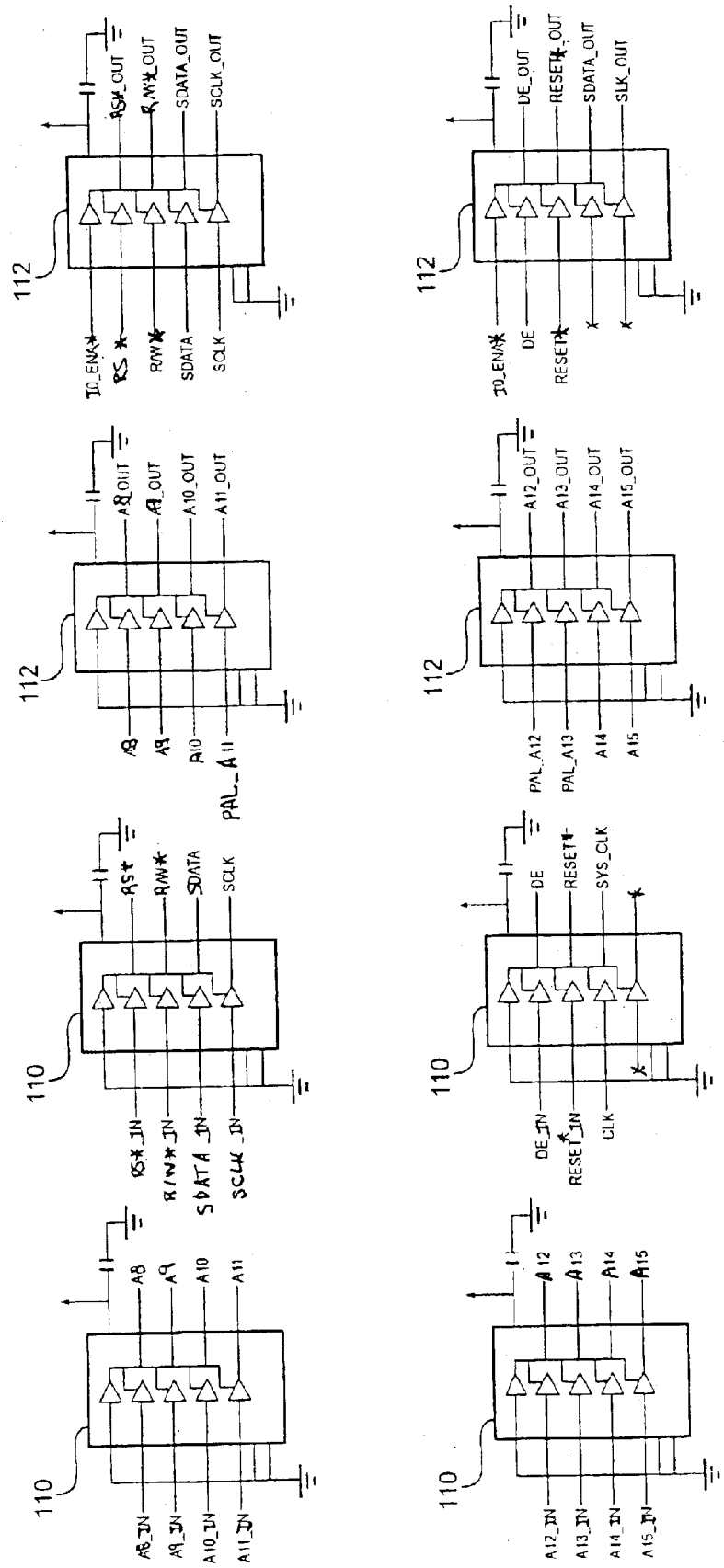
FIGS. 13A–B are a further detail of the components mounted on the expansion board according to FIG. 7.
Figure 13B:
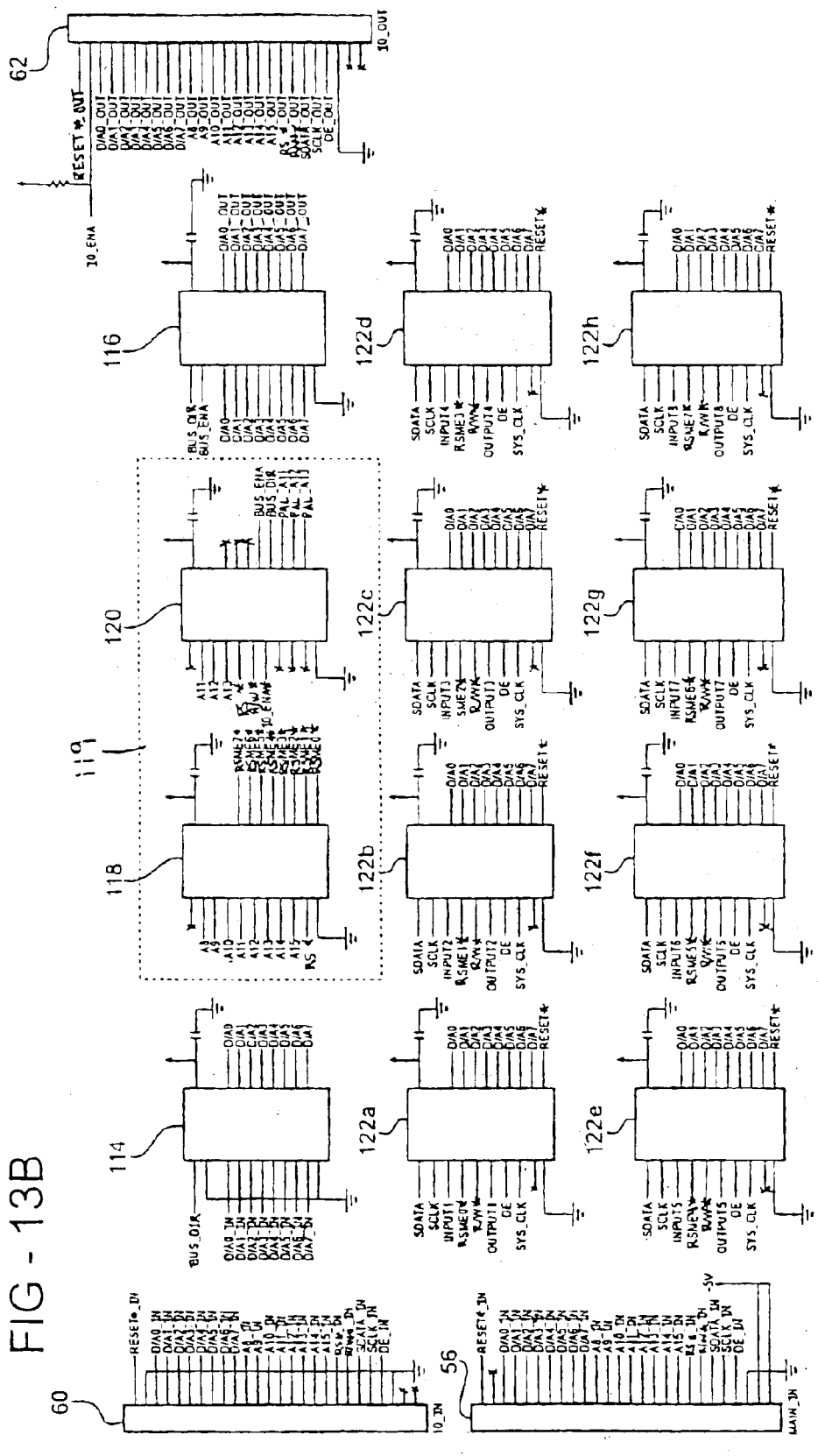

As shown in FIGS. 13A–B and previously described, each expansion board 16 includes an expansion in port 60 and an expansion out port 62. Generally, each expansion board 16 also includes a motherboard interconnect 56 because of the modular design of the expansion board 16. However, the components of the expansion board 16 shown in FIG. 13 use only input signals from either the expansion in port 60 or the motherboard interconnect 56, not both. If the expansion board 16 shown in FIGS. 13A–B is part of the main controller 10a/b, the main microcontroller 37 sends instructions in the form of address signals and other signals to, and receives responses to data queries from, the expansion board 16 through its motherboard interconnect 56. If the expansion board 16 is part of the expansion module 102, its expansion in port 60 receives the signals representing instructions from the expansion out port 62 of an expansion board 16 of either the main controller 10a/b or another expansion module 102. In any case, the expansion out port 62 of a particular expansion board 16 is only used where an expansion module 102 is connected in series with that particular expansion board 16.

As mentioned, main microcontroller 37 sends both read and write commands, or instructions, in signals addressing the output microcontrollers 122a–h of the main controller 10a/b and any expansion modules 102. The main microcontroller 37 sends the signals in accordance with an operating program. The read commands query one or all of the output microcontrollers 122a–h. The write commands can be used to write data to all of the output microcontrollers 122a–h. Generally, however, the write commands include program signals that program each output microcontroller 122a–h with the instructions as to what conditions must exist for it to send enabling and disabling signals to its respective Output 1–8 during each cycle of the position sensor device. The program commands are associated with functions of the PLS 10, such as the INPUT CONFIGURATION, SET-POINT DATA, TIME-BASED OUTPUTS and LINEAR SPEED COMPENSATION functions previously discussed. Other functions are discussed in detail hereinafter with the discussion of the programming of the PLS 10.

Certain of the signals received from the expansion in port 60 or the motherboard interconnect 56 are fed through four line drivers 110, which strengthen and amplify those signals, allowing them to be passed through to sequential boards if necessary. Generally, these signals are the address signals, e.g., A[15:8], but they also include reset and clock signals, among others. Most of these signals (except for A[13:11], discussed herein) pass through four similar output line-drivers 112 to the next board through the expansion out port 62. The line drivers 110, 112 are any standard line-driver.

The signals D/A0_IN to D/A7_IN perform a dual function. When an output microcontroller 122 is addressed by an address signal, these signals contain a specific address for a memory location of the microcontroller 122. After the output microcontroller 122 is identified, these signals become data lines carrying data to write to, or read from, the latched output microcontroller 122. As address signals, upon entering the expansion board 16, they proceed through a standard transceiver 114, such as a 3-state octal bus transceiver, buffering the expansion board 16 from the board sending the signals. Then, these signals proceed to the next expansion board 16, if any, through another standard transceiver 116 buffering the two expansion boards 16. When the R/W* signal sent with the address signals is a write signal, the data lines sent along the same transceivers 114, 116 are written to one output microcontroller, if the address A[15:8] addresses a particular output microcontroller 122, or to all output microcontrollers 122a–h if a broadcast bit in the address is enabled. When the R/W* signal sent with the address signals is a read signal, the data lines carry the data from the addressed output microcontroller 122 back to the main microcontroller 37 through the transceivers 114, 116 in the reverse direction.

As mentioned, the signals passed through the line drivers 110, 112 are mainly those that concern addressing the appropriate output channel of the appropriate expansion board 16, i.e., the address signals. The addressing scheme used is particularly critical where, as here, the expansion boards 16 are all identical in circuitry. Thus, the addressing scheme needs to be able to identify which board 16 is addressed, in addition to identifying the intended output channel Ch 1–8. One addressing scheme for the PLS 10 of the present invention is shown in FIGS. 18A and 18B and described in reference to FIGS. 13A–B; however, prior art methods of addressing circuit boards wherein each expansion board 16 is assigned a unique address also work with the disclosed PLS 10.

In the example provided in FIGS. 13A–B, the address signals A[15:8], together with the select logic 119, which includes a board select 118 and a module counter 120, perform the identification of expansion board 16 and output channel Ch 1–8. Specifically, the address A[14] is a broadcast bit that addresses all expansion boards 16. The module address A[13:11] is an input used by the board select 118 and the module counter 120 to determine which of the up to eight serially-connected expansion boards 16 are addressed. The circuit, or module, address A[10:8] indicates to which of the eight output microcontrollers 122a–h of the addressed expansion board 16 the program signals are addressed. Address A[15] is not used in the illustrated embodiment of the invention. The address signals A[7:0], which indicate a particular address of the selected output microcontroller 122a–h, do not pass through the select logic, but instead proceed through the transceivers 114, 116 to the output microcontrollers 122a–h.

Figure 18B:
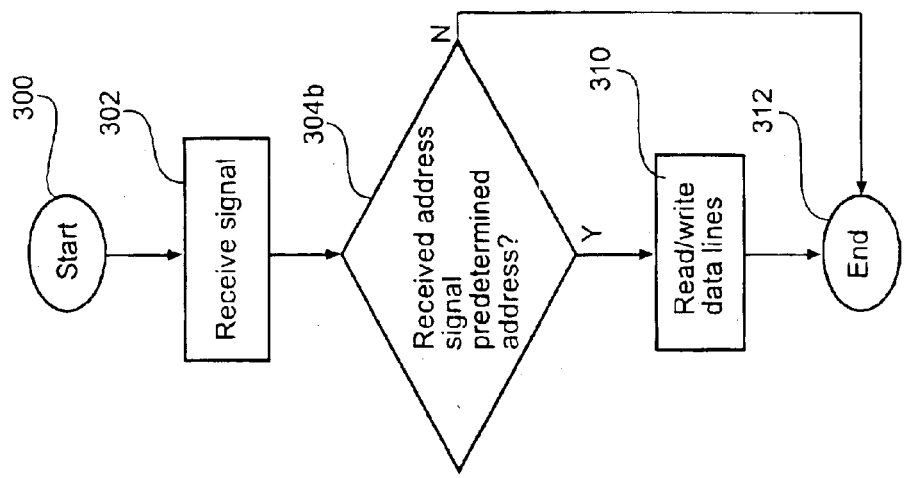
FIGS. 18A and 18B are block diagrams of a method of addressing serially-connected circuits according to the present invention.
Figure 18A:
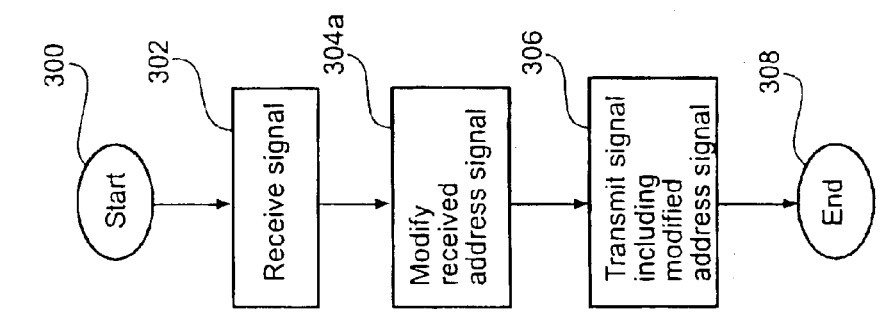

The method of addressing output channels of the circuit boards is shown in FIGS. 18A and 18B. Prior to the start 300 of addressing the output channels, the main microcontroller 37 initializes its operating program, as is standard. After initialization, the main microcontroller 37 starts communicating with the remaining components of the main controller 10a/b and any expansion modules 102. The main microcontroller 37 starts sending sequential signals to either program or operate the PLS 10 starting at step 300. The first expansion board 16 receives the first signal in step 302. Except where all expansion boards 16 are addressed as indicated by a high input for the broadcast address bit A[14], the board select 118 compares the module address A[13:11] of the signal to a predetermined address in step 304b of FIG. 18B in order to determine if the current expansion board 16 is the board for which the data lines are intended.

At the same time, and regardless of the status of the broadcast bit A[14], the module address A[13:11] is modified by a predetermined value in the module counter 120, such as by incrementing or decrementing the address by one, in step 304a of FIG. 18A. The signal, including the modified addresses sent in step 306 to the next expansion board 16, if any, through the expansion out port 62. The sequence shown in FIG. 18A then ends for the first board at step 310. The next, or second, expansion board 16 receives the modified signal in step 302. The board select 118 of the board 16 compares the module address A[13:11] it receives, which was previously modified, to the predetermined address in step 304b, shown in FIG. 18B. The module counter 120 of the board 16 modifies the address by the same predetermined value in step 304a of FIG. 18A and passes it on to the next expansion board 16, if any, at step 306, ending the sequence of FIG. 18A for the second board 16, and so on. In this manner, the expansion board 16 to be addressed is determined based upon the physical interconnection of the expansion board 16 in relation to the other expansion boards 16 in the PLS 10. If any of the expansion boards 116 receives a module address A[13:11] that matches the predetermined address when its board select 118 performs step 304b of FIG. 18B, the corresponding data lines are supplied to or from the appropriate latched output microcontroller 122a–h in step 310. Step 304b also occurs for each board 16 if the broadcast bit A[14] is enabled regardless of the value of the module address A[13:11]. The sequence of comparison and reading/writing, if appropriate, represented in FIG. 18B ends at step 312 for each board 16.

The board select 118 and the module counter 120 of the select logic 119 are best explained by example. If the predetermined address is [000], then the motherboard 14 sends a signal of [010] for the module address A[13:11] to address the third expansion board 16 in the series. The motherboard interconnect 56 sends the signals shown in FIG. 11, including A[13:11], through the line drivers 110 to be received by the board select 118 and the module counter 120 in step 302 of FIGS. 18A and 18B. The board select 118 compares the address A[13:11] to the predetermined address in step 304b of FIG. 18B. The board select 118 sees that the module address A[13:11] is not equal to [000]. Whether or not the module address signal A[13:11] is equal to the predetermined address, the module counter 120 decrements the module address by 1 to [001] in step 304a of FIG. 18A. The modified module address PAL_A[13:11] and the other indicated signals proceed through the line drivers 112. The read/write signal R/W*, the address signals A[7:0] and other signals sent through the transceivers 114, 116, go to the next expansion board 16 through the expansion out port 62 in step 306 of FIG. 18A. The data lines D[7:0] do not write to or read from any of the output microcontrollers 122a–h of the first expansion board 16 because the addresses did not match in step 304b of FIG. 18B, assuming the broadcast bit A[14] is not enabled. The addressing scheme then ends for the first expansion board in step 308 of FIG. 18A and in step 312 of FIG. 18B.

The address signals pass through the expansion in port 60 and the line drivers 110 of the second expansion board 16. The board select 118 compares the module address A[13:11], which is [001], to the predetermined address in step 304b of FIG. 18B and sees that the address A[13:11] is not equal to the predetermined address of [000]. None of the output microcontrollers 122a–h of the second expansion board 16 are addressed, and the portion of the addressing scheme represented in FIG. 18B ends for the second expansion board 16 step 312. Whether or not the module address signal A[13:11] is equal to the predetermined signal, the module counter 120 decrements the address by one count to [000] in step 304a of FIG. 18A. Again, this modified module address PAL_A[13:11] proceeds with the remainder of the signal through the line drivers 112 of the second expansion board 16. The signals that pass through the transceivers 114, 116 also go to the next expansion board 16, if any, through the expansion out port 62 in step 306. The portion of the addressing scheme represented in FIG. 18A ends at step 308. The sequence of steps in FIGS. 18A and 18B continue for the remainder of the serially-connected expansion boards 16. Signals are continuously sent from the main microcontroller 37 to the expansion board(s) 16. This assures high speed operations with relatively minimal computing delays because as board select 118 of each board 16 is checking the module address A[13:11] against the predetermined address, the module counter 120 is modifying the module address A[13:11] and sending the modified address, with the remainder of the signal, to the next expansion board 16.

Only the board select 118 of the third expansion board 16 sees that the module address A[13:11] is equal to the predetermined address [000] in step 304b of FIG. 18B because A[13:11] is only equal to [000] once. Of course, the module counter 120 can be implemented in a variety of ways. For example, the counter 120 can increment up to a predetermined value of [111], by example, instead of incrementing down. In a particularly simple application, once the counter 120 reaches the predetermined value, the counter 120 merely rolls over to a value that guarantees that the predetermined value is not reached twice given the number of interconnected expansion modules 102. For example, where the counter 120 increments down to a value of [000], the counter 120 can start again at [111], or n−1, where n is the maximum number interconnected expansion boards 16 according to the described embodiment of the invention, i.e., eight. Of course, more complicated digital counting schemes can be used.

The third expansion board 16 sees the module address A[13:11] is equal to [000] and knows that the signals are intended for at least one of the output channels Ch 1–8. In the example of FIG. 13, these signals are directed to the output microcontrollers 122a–h controlling the output devices. If R/W* is a write signal, the data lines D[7:0] associated with the address signal are written to the appropriate address A[7:0] of the output microcontroller 122a–h indicated by the value of the circuit address A[10:8], which is latched by the signal AS*. Alternatively, if R/W* is a read signal, the output microcontroller 122a–h indicated by the value of the circuit address signal A[10:8] is latched by the signal AS* and provides the data at its address A[7:0] to the data lines D[7:0] for transmittal of the data back to the main microcontroller 37. As one example, if the circuit address A[10:8] is[101], the data lines are intended for output microcontroller 122f.

An example of a complete address and data line signal that will write a value of 160 to address 1 of the second output microcontroller 122b on the second expansion board 16 occurs when A[15] is set to [0] because it is not used, and the broadcast bit A[14] is set to [0] so that only one output microcontroller 122 is addressed. Module address lines A[13:11] are equal to [001] to address the second expansion board 16. Circuit address lines A[10:8] are [001], which represents output microcontroller 122b. Address lines A[7:0] indicate which address of the output microcontroller 122b is addressed, here [00000001], which is address 1. The data lines D[7:0] are equal to [10100000], the binary value for 160.

The board select 118 and the module counter 120 are each preferably programmable array logic devices as shown. However, it is clear that either or both could be any digital circuitry, for example, a microcontroller or a microprocessor with memory. Although more cumbersome, the functions of these devices could, of course, be implemented with discrete logic components. This embodiment of the PLS 10 and the addressing scheme is described in reference to address and data sent in binary format decrementing the module address by one count. Although modifying the module address using a module counter 120 decrementing or incrementing by one count is most easily implemented here, any predetermined change in the address at each module counter 120 is possible, as long as the amount of change remains constant and the predetermined address is not repeated at any expansion board 16 as the module counter 120 proceeds through all of the address changes. Further, one of skill in the art will recognize that any addressable format, not just binary format, is appropriate. For example, binary-coded decimal (BCD) format is also popular for computing applications.

It is evident that the addressing scheme described is a powerful one with flexibility to be incorporated into and modified for a variety of applications where serially-connected devices are addressed. Even in its incorporation into the PLS 10 with distributed intelligence, variations are possible. For example, the scheme as described sends data lines sequentially after the signal containing the module address. This separation is not done if a signal of longer length is sent, incorporating the data lines. Further variations are also possible; all of the address and data line resolutions are merely used for illustration. For example, in the PLS 10 where output microcontrollers 122 are incorporated into each output channel, the data lines support 8-bit data for reading from and writing to the 8-bit output microcontrollers described, but output circuits needing signals longer or shorter than 8-bits can be used. In fact, prior art programmable limit switches can incorporate the addressing scheme through the addition of the functions of the select logic 119 described herein to its serially-connected outputs. In the case of prior art programmable limit switches, the addressing scheme has as its purpose the identification of which relay(s) or driver(s) of which circuit board the microprocessor of the switch is attempting to address. In that case, the data lines signal could contain a simple enable/disable bit. The data lines signal could also contain one or more simple enable/disable signals in an application where the serially-connected devices are, for example, annunciator panels for a display.

The addressing scheme can also be used to address any system incorporating serially-connected microcontrollers or microprocessors as discussed with respect to the controllers of the PLS 10. The scheme can further be used with, for example, serially-connected memory being addressed by a central processing unit such as a microprocessor or microcontroller. In that case, the signals from the processor would be tailored to the application. One example is that merely addressing a series of addresses of non-volatile memory can unlock the memory for writing; no data lines need be sent for this application. The scheme can also simplify the incorporation and control of machines into an industrial process without the need for hardware devices, such as the DIP switches mentioned, to assign a unique address to each machine.

Returning now to the application of the addressing scheme to the PLS 10, it is clear from the description that the addressing scheme described is used during both the programming and the operation of the PLS 10 to both write to and read from the output microcontrollers 122a–h of each of the expansion boards 16. The output microcontrollers are written to upon a start up or upon a change in functions of the operating program necessitating a change in the program commands of an individual microcontroller. Typically, however, once the microcontrollers are written to the first time, operation of the PLS 10 proceeds uninterrupted. Specifically, the main controller 10a/b receives raw position values from a position sensor device. During operation, the output microcontrollers 122 generally receive the raw position values through SDATA_IN and SCLK_IN and adjust them, if necessary, to internal position values. Each output microcontroller also receives input signals from its respective input connector, Input 1–8. Each output microcontroller 122 uses all of the signals it receives from the motherboard interconnect 60 or the expansion in port 56 to operate the PLS 10 according to the configuration programmed for its related input and output channels. The main microcontroller 37 can also introduce certain efficiencies in the operation of the output microcontrollers 122a–h, by performing calculations needed by all and writing the results of the calculations to each. For example, speed of the workpiece, as measured by the speed of the position sensor device, can be calculated by the main microcontroller 37 periodically and can be broadcast with a write command to all output microcontrollers 122a–h according to the addressing scheme previously discussed.

The intelligence associated with each output channel Ch 1–8 results in the fast and powerful operation of the PLS 10 because the main microcontroller 37 is not individually controlling each Ch 1–8, but is merely programming each of the output microcontrollers 122a–h to control its own output connector Output 1–8. Each output microcontroller 122a–h controls the signal it sends to its respective Output 1–8 based upon its programmed settings and inputs from the system. Programming of the PLS 10 can occur through a variety of means. For example, data entry can be performed through the user port 52, which allows programming wherein programming data is entered off-line and uploaded.

Figure 14:
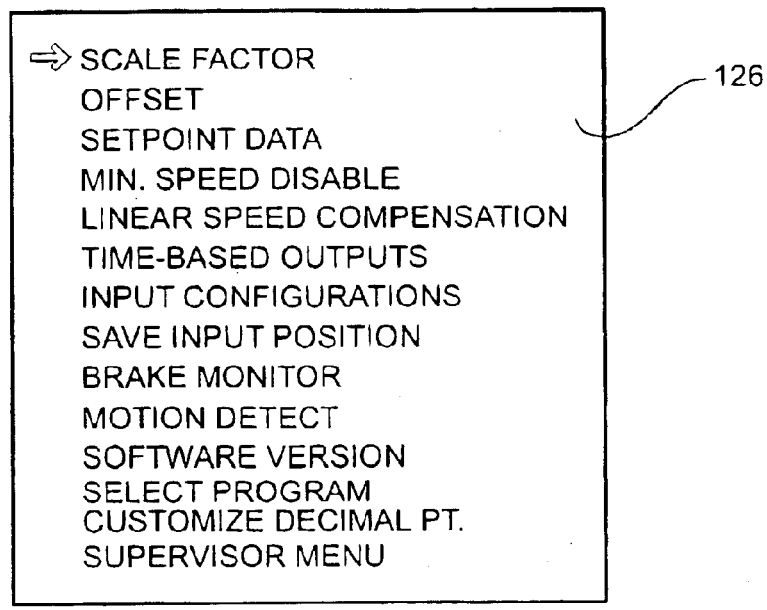
FIG. 14 shows the scrolling main menu according to the present invention.

One particularly inventive means of programming is through the use of scrolling menus. FIG. 14 is one version of a scrolling main menu 126 the user uses to choose a command and enter the data related to the commands for each output microcontroller and the PLS 10 as a whole. Normally, and as shown in FIG. 3, the main display 124 shows the current position of the position sensor device in its cycle and the speed of workpieces progressing through the system as measured by the position sensor device. The scrolling main menu 126 is brought up when the MENU key 24 is pressed. The scrolling main menu 126 is displayed two lines at a time through the display window 22 by turning the scroll knob 32. By pressing the ENTER key 30 when the select symbol ⇨ is next to a function, that function of the PLS 10 is accessed. In the example shown in FIG. 14, the SCALE FACTOR function is selected by the select symbol ⇨. Of course, a variety of typographical symbols can be used as the select symbol.

Figure 15:
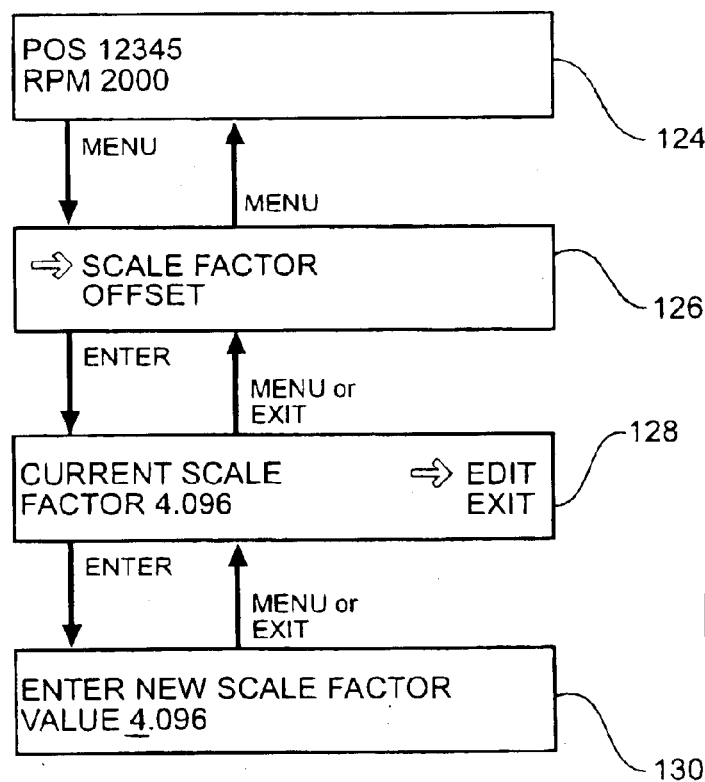
FIG. 15 is a block diagram representing one use of the scrolling display for data entry.

FIG. 15 shows a series of displays to facilitate the discussion of PLS 10 programming utilizing the scrolling main menu 126 of the alphanumeric display 36. As mentioned, the display 36 normally shows the main display 124, i.e., position (POS) and speed (RPM). By pressing the MENU key 24, the user toggles between the main display 124 and the scrolling main menu 126. The user uses the scroll knob 32 to select a function from the scrolling main menu 126 shown in FIG. 14. In this example, the SCALE FACTOR function and the OFFSET function are shown in the display window 22. The select symbol ⇨ is next to SCALE FACTOR. When the ENTER key 30 is pressed, the user enters the edit menu display 128 for the SCALE FACTOR function. The SCALE FACTOR function allows the user to adjust the scale factor for the PLS 10. The current setting for the scale factor is displayed as well as an edit menu. By using the scroll knob 32, the user scrolls through the edit menu, which includes the functions of EDIT, EXIT, and HELP. Selecting EXIT with the select symbol ⇨ and pressing ENTER key 30, or pressing the MENU key 24, returns the user to the scrolling main menu 126. Selecting HELP brings up a help display for the selected function.

Selecting EDIT with the selector symbol ⇨ and pressing the ENTER key 30 brings the user to a number entry display 130, where the user changes the existing setting. More specifically, in the number entry display 130, the user rotates the scroll knob 32 to scroll through a series of digits in place of an existing value for the underlined digit, here 4. The user moves between the digits by using either one of the arrow keys 26 or 28. When the corrected setting is complete, either the MENU key 24 or the ENTER key 30 is pressed to return to the edit menu display 128. Similar procedures are followed for each function of the PLS. Where a setting involves an alphanumeric input, such as a setting brought up with the LABEL INPUTS function hereinafter discussed, the scroll knob 32 scrolls through the letters of the alphabet and, optionally, through digits 0–9.

Many of the functions of the scrolling main menu 126 have been previously discussed with reference to the inputs and outputs of the PLS 10. For example, the INPUT CONFIGURATION function configures the inputs as, for example, one of a reset-to-preset input, an output enable input or a die protection input previously discussed. The outputs are also configured as previously discussed, for example, using the following functions: MOTION DETECT, SETPOINT DATA, LINEAR SPEED COMPENSATION, and TIME-BASED OUTPUTS. Other functions of the PLS 10 are also shown in the scrolling main menu 126. Some have no effect on the operation of the PLS 10. For example, SOFTWARE VERSION merely displays the version of the operating program, or software, operating with the PLS 10. The function CUSTOMIZE DECIMAL POINT affects only the resolution of position data shown on the display 36. The OFFSET function synchronizes the digital display 36 with the actual position of the machine driving the system such as the conveyor belt previously mentioned. Other functions reflecting further flexibility of the PLS 10 have not been previously described.

An optional feature used with outputs configured as linear speed compensation outputs is a minimum speed disable, programmed through the MIN. SPEED DISABLE function. This feature programs the limit switch outputs to automatically turn off if the speed drops below a programmed value. Alternately, it prevents the output channel from turning on until a desired operating speed is reached. This feature is useful where, for example, a glue gun must turn off or an actuator must retract during emergency stop conditions.

Another feature activated through the scrolling main menu 126 is the SAVE INPUT POSITION function. When setting up a reset-to-preset input, the user chooses whether to save the reset position to memory either every time the input resets, never, or only when prompted by the SAVE INPUT POSITION function. The reset position is the position value of the counter of a particular output channel when the reset-to-preset input triggered a reset of the counter of the microcontroller for that channel. The SAVE INPUT POSITION function, at any time, saves the reset position for any or all of the output channels configured with a reset-to-preset input.

The BRAKE MONITOR function is discussed with the discussion of the final selection on the scrolling main menu 126, the SUPERVISOR MENU. The scrolling supervisor menu 132 brought up when the selector symbol ⇨ is next to the SUPERVISOR MENU and the ENTER key 30 is pressed is shown in FIG. 15. The supervisor menu 132 contains many functions initializing and optimizing the PLS 10. For example, the EXPANSION BOARDS function tells the main controller PLS 10 how many expansion modules 102 are connected to the system.

The INITIALIZE SYSTEM function presets all of the PLS 10 calibration settings to factory defaults and deletes programming, except for user and supervisor passwords, which are set using the DEFINE USER PASSWORD and DEFINE SUPV PASSWORD functions, respectively. The user password can be required prior to editing any of the functions previously discussed with respect to the scrolling main menu 126. The supervisor password is needed to access the supervisor menu 132. In addition to the protection afforded by requiring a user password, the supervisor can also use the LOCKOUT FUNCTIONS function. This function allows the supervisor to enter a second password that, without entering the supervisor's password, blocks access to certain programmed parameters. For example, scale factor, offset and any individual input or output channel can be locked.

Many of the functions of the supervisor menu 132 are tied to the settings of the program connector 48, shown in FIG. 5. The program connector 48 is an eight-pin connector allowing the supervisor or user enable various features of the PLS 10. A standard user-supplied security switch (not shown) is connectable between two of these inputs, namely COM and PRG. When the security switch is closed, the PLS 10 is operable in program mode, while an open switch places the PLS 10 in run mode. In run mode, all of the functions of the PLS 10 are viewable, but data cannot be changed. An optional enable feature allows a user-supplied enable switch (not shown) to be connected between the COM and ENA inputs. With the enable switch open, the PLS 10 outputs are enabled, while a closed enable switch disables the outputs.

The program connector 48 has a four-pin program select (PRG SEL), which provides a means for the user to input a program number. The PLS 10 can store up to fifteen different programs. The SELECT PROGRAM function of the supervisor menu 132 allows the supervisor to name, edit, copy and access one of the programs 1–15 at any time. The INITIALIZE PROGRAM function erases all programmed values for a selected program.

The supervisor menu 132 has a SET FAULT CLEAR OPTION function, which selects how faults are cleared from the PLS 10 when the fault check feature is enabled. The fault check feature is enabled by connecting a user-supplied fault check reset switch (not shown) between the COM and FLT IN inputs of the program connector 48 shown in FIG. 5. This activates the fault check enable input, energizing a fault check relay output (F.C.), which is a 2-pin output shown as part of the 20-pin output connector 82 of FIG. 6. The fault check provides a mechanism to verify that all major PLS 10 functions are operating properly.

Occurrence of a fault de-energizes the mechanical fault check output (F.C.) and the outputs of the PLS 10. The types of faults that should disable system operations upon detection include disconnected or severed cables from the position sensor device, open or shorted signals at the position connector 46, electronic failure of the conversion of the signals from the position connector 46 and microprocessor failure, to name a few. The programmed setting of the SET FAULT CLEAR OPTION function of the supervisor menu 132 determines in which of three ways the user clears faults displayed on the display 36. The first setting provides that pressing the ENTER key 30 is the only way to clear a fault and resume normal operation of the PLS 10. The second setting provides that only cycling the fault check enable input by toggling the fault check reset switch (not shown) clears a fault. A third option provides that either pressing the ENTER key 30 or cycling the fault check enable input clears a fault.

Another function accessible through the supervisor menu 132 is the ENABLE BRAKE INPUT function, which enables or disables monitoring of the optional two-pin brake monitor input (BK IN) shown in FIG. 6. The brake input BK IN receives a signal, typically at 90–140 volts AC, from a brake/clutch solenoid of the system in which the PLS 10 is incorporated. The brake monitor input relay 78 shown in FIG. 5 steps down the voltage for input into one of the output microcontrollers 122 directly or into the main microcontroller 37, which then signals an output microcontroller 122. The output relay 80 of the output channel associated with the designated output microcontroller 122 is used as a brake monitor output relay. The output relay 80 of the output channel associated with the designated output microcontroller 122 is used as a brake monitor output relay. When the ENABLE BRAKE INPUT function is enabled, the output microcontroller monitoring the brake monitor input relay 78 looks for a loss of input voltage at the input BK IN. When the input voltage drops out, a high speed counter starts. The counter continues until the output microcontroller stops receiving position values from the position sensor device indicating a change in position. If the counter goes above a pre-programmed limit, depending upon the setting programmed by the BRAKE MONITOR function of the main menu 126, the output microcontroller sends a signal through its output relay 80, which operates as the brake monitor output relay. The relay 80 sends an enabling signal to its associated output connector, which preferably results in a reaction to the excessive delay in the stopping time. One possible use of this function is in the stamping industry to measure the stopping time of a stamping press.

The supervisor menu 132 also provides a number of functions affecting the appearance of the PLS 10. The CUSTOMIZE DISPLAY function sets the contents of the main display 124. Normally, position data including position and speed are displayed. However, brake data, including stopping time and stopping degrees, or program data showing the active running program, can be shown in addition to or instead of the position data. If all three sets of data are hidden, the display 36 continuously shows a message programmed by the supervisor in the DEFINE TITLE SCREEN function of the supervisor menu 132. Otherwise, the message programmed using the DEFINE TITLE SCREEN function is displayed only during power up. The supervisor menu 132 provides the capability of labeling Inputs 1–64 and Outputs 1–64 using the LABEL INPUTS and LABEL OUTPUTS functions, respectively. This provides an easier interface for the user.

Figure 17A:
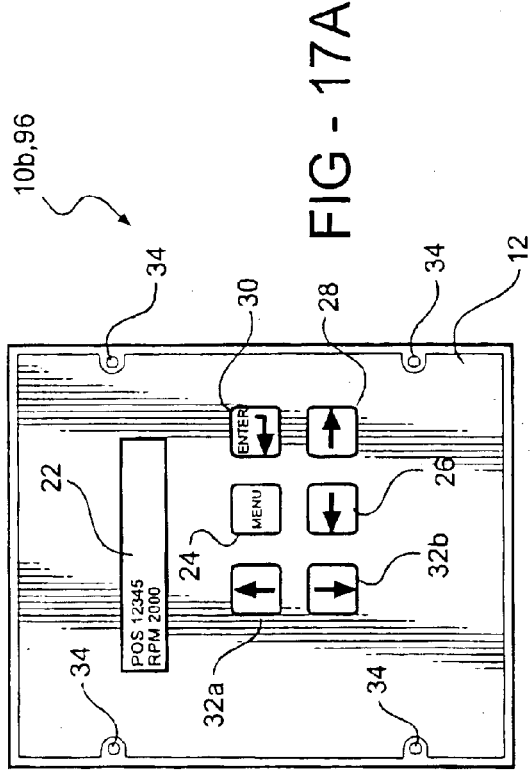
FIGS. 17A and 17B show two alternative embodiments for the front face of the stand-alone main controller module and the remote operator interface module according to the present invention.
Figure 17B:
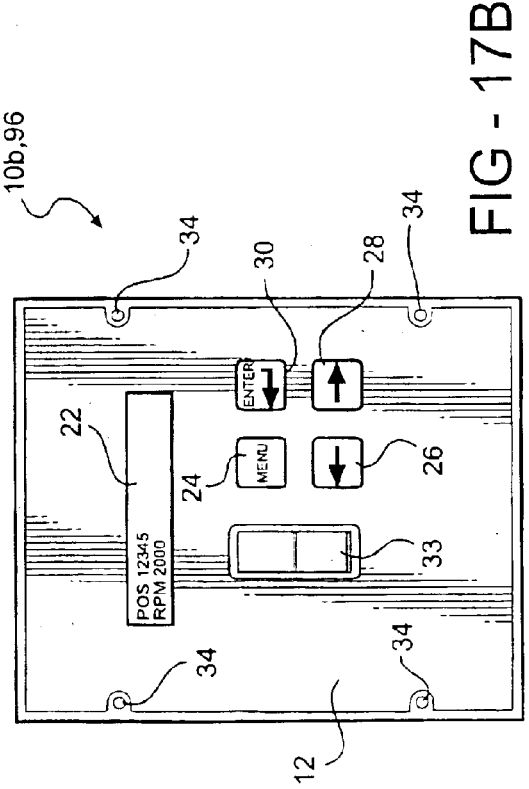

FIGS. 17A and 17B show alternative embodiments through which data entry using the alphanumeric display 36 can be accomplished. FIG. 17A shows, in place of the scroll knob 32, two switches in the form of buttons or keys 32a and 32b, which are up and down arrows, indicating a direction of scroll. FIG. 17B shows a three-position switch 33 in place of the scroll knob 32, wherein the three-position switch can be successively toggled up or down to scroll through the letters of the alphabet or through the digits as previously discussed. The arrows keys 26 and 28 can similarly be replaced by a three-position switch 27. Of course, other means of scrolling through data are possible, such as a joystick, which could replace both the scroll knob 32 and the arrow keys 26, 28.

The programmable limit switch as shown and described is a flexible, powerful switch with distributed intelligence capable of fast and accurate control of a system containing multiple input and output devices. An easy means for programming the switch, and other prior art switches, is also disclosed through the use of the alphanumeric display. The inventive addressing method can be used for easy communications between the main controller and respective output controllers, as well as in a variety of other applications.

What is claimed is:

1. A programmable limit switch for establishing a timing of events in a workpiece treatment process carried out as a workpiece traverses through a production field, comprising:

a plurality of output channels for receiving position data, each position value of the position data representing an advance of the workpiece through the production field, and for producing device actuation signals, each of the plurality of output channels connectable to an output device responsive to the respective device actuation signals and located in the production field; and an output controller in each of the plurality of output channels, each output controller individually programmable to change a state of the respective device actuation signals; and wherein at least one output controller is individually programmable to change a state of the respective device actuation signals in response to reaching selected position values.

2. The programmable limit switch according to claim 1, further comprising:

a main programmable controller operable to execute an operating program including a plurality of functions, the operating program programming each of the output controllers.

3. The programmable limit switch according to claim 2, further comprising:

means for entering data into the plurality of functions of the operating program.

4. The programmable limit switch according to claim 1, further comprising:

an alphanumeric display for displaying data associated each of a plurality of functions of the operating program; and means for scrolling the display through each of the plurality of functions.

5. The programmable limit switch according to claim 4 wherein the scrolling means is one of a scroll knob and at least one switch.

6. The programmable limit switch according to claim 4 wherein the data includes settings and the scrolling means is operable for scrolling the display through selectable changes to the settings.

7. The programmable limit switch according to claim 6, further comprising:

at least one button operable to enter changes to the settings.

8. The programmable limit switch according to claim 1 wherein each output controller is programmable for receiving the position data and producing output signals in accordance with an operating program and wherein each of the plurality of output channels further comprises:

a relay for receiving the output signals and producing device actuation signals; and an output connector connectable to the respective output device and receiving the device actuation signals from the relay.

9. The programmable limit switch according to claim 8 wherein the output controller of each of the plurality of output channels is a microcontroller.

10. The programmable limit switch according to claim 1, further comprising:

a connector connectable to means for producing position inputs; and means for transmitting the position inputs as position data to the plurality of output channels.

11. The programmable limit switch according to claim 1 wherein at least one of the output controllers is programmable to change a state of a respective device actuation signal at an ON setpoint associated with a first position value and to change a state of the respective device actuation signal again at an OFF setpoint associated with a second position value, the ON and OFF setpoints defining a respective setpoint pair.

12. The programmable limit switch according to claim 11 wherein the at least one of the output controllers is programmable to add a first offset to the respective ON setpoint based upon a comparison of a base speed to an actual speed of travel determined from a sample number of position values and to add a second offset to the respective OFF setpoint based upon the comparison.

13. The programmable limit switch according to claim 12 the at least one of the output controllers is programmable to de-energize the respective device actuation signal when the actual speed of travel drops below a predetermined speed.

14. The programmable limit switch according to claim 1, further comprising:

a housing; and wherein the plurality of output channels are mounted on at least one circuit board within the housing.

15. The programmable limit switch according to claim 14, further comprising:

a main programmable controller operable to execute an operating program and mounted within the housing; and a connector connectable to means for entering data into the operating program.

16. The programmable limit switch according to claim 15 wherein the means for entering data into the operating program is external to the housing.

17. The programmable limit switch according to claim 1 wherein the plurality of output channels are mounted on two or more expansion circuit boards, each expansion circuit board having an expansion in port and an expansion out port through which the two or more expansion circuit boards are serially connected.

18. The programmable limit switch according to claim 17, wherein the two or more expansion circuit boards are each enclosed within a separate housing, and further comprising:

a main programmable controller operable to execute an operating program and mounted within a first one of the housings.

19. The programmable limit switch according to claim 18 wherein the first one of the housings further includes:

a connector connectable to means for producing position inputs; and means for transmitting the position inputs as position data to the plurality of output channels.

20. The programmable limit switch according to claim 18, further comprising:

an alphanumeric display for displaying data associated each of a plurality of functions of the operating program, the display viewable through the first one of the housings;

means for scrolling through and for changing the data on the alphanumeric display, the scrolling means mounted on the first one of the housings; and at least one button operable to enter the changed data and mounted on the first one of the housings.

21. The programmable limit switch according to claim 17 wherein the two or more expansion circuit boards are each enclosed within a separate housing and further comprising:

a plurality of input connectors for receiving device input signals and connectable to respective input devices located within the production field, each input connector coupled to a respective output channel and mounted on the respective housing.

22. The programmable limit switch according to claim 1, further comprising:
a plurality of input connectors for receiving device input signals and connectable to respective input devices located within the production field, each input connector coupled to a respective output channel.

23. The programmable limit switch according to claim 22 wherein at least one of the output controllers is programmable to change a state of a respective device actuation signal at an ON setpoint associated with a first position value and to change a state of the respective device actuation signal again at an OFF setpoint associated with a second position value, the ON and OFF setpoints defining a respective setpoint pair.

24. The programmable limit switch according to claim 23 wherein the at least one of the output controllers is programmable to ignore the setpoint pair unless a signal state of at least one of the respective plurality of input connectors changes in a period prior to the ON setpoint.

25. The programmable limit switch according to claim 23 wherein the at least one of the output controllers is programmable to change the state of the device actuation signal at the respective ON setpoint and to change the state of the device actuation signal again prior to the respective OFF setpoint if a signal state of a respective input connector changes between the ON setpoint and the OFF setpoint.

26. The programmable limit switch according to claim 22 wherein at least one of the output controllers is programmable with a first dwell point and a second dwell point, the first and second dwell points defining a dwell window, and the at least one of the output controllers is programmable to indicate a fault when a signal state of a respective input connector one of does and does not change within the dwell window.

27. The programmable limit switch according to claim 22 wherein at least one of the output controllers is programmable with a first dwell point and a second dwell point, the first and second dwell points defining a dwell window, and the at least one of the output controllers is programmable to indicate a fault when a signal state of a respective input connector changes after the first dwell point and changes state a second time prior to the second dwell point.

28. The programmable limit switch according to claim 22, further comprising:
a connector connectable to means for producing position inputs;
means for transmitting the position inputs as the position data to the plurality of output channels; and wherein
at least one of the output controllers includes a counter and the at least one of the output controllers is programmable to reset the counter to a preset position value from which to start counting position values when a signal state of a respective input connector changes to a first state.

29. The programmable limit switch according to claim 1 wherein at least one of the output controllers is programmable to change a state of a respective device actuation signal in response to a first position and to change the state again after a predetermined period of time.

30. The programmable limit switch according to claim 1 wherein the state of the respective device actuation signals comprises one of an enabling state and a disabling state.

31. The programmable limit switch according to claim 1 wherein each output controller simultaneously receives the position data.

32. The programmable limit switch according to claim 1, further comprising:
a main programmable controller operable to execute an operating program; wherein each output controller communicates status information only to the main programmable controller.

33. The programmable limit switch according to claim 32 wherein each output controller receives the position data simultaneous with receipt by the main programmable controller of the position data.

34. A programmable limit switch for establishing a timing of events in a workpiece treatment process carried out as a workpiece traverses through a production field, comprising:
a plurality of output channels for receiving position data, each position value of the position data representing an advance of the workpiece through the production field, and for producing device actuation signals, each of the plurality of output channels connectable to an output device responsive to the respective device actuation signals and located in the production field;
an output controller in each of the plurality of output channels, each output controller individually programmable to change a state of the respective device actuation signals; and wherein at least one output controller is individually programmable to change a state of the respective device actuation signals in response to reaching selected position values; and
a brake input operably connectable to a brake; and wherein
one of the output controllers is programmable to start a counter when the brake input de-energizes and stop the counter when the output channel does not receive a change in position value.

35. A programmable limit switch for establishing a timing of events in a workpiece treatment process carried out as a workpiece traverses through a production field, comprising:
a plurality of output channels for receiving position data, each position value of the position data representing an advance of the workpiece through the production field, and for producing device actuation signals, each of the plurality of output channels connectable to an output device responsive to the respective device actuation signals and located in the production field; and
an output controller in each of the plurality of output channels, each output controller individually programmable to change a state of the respective device actuation signals; and wherein at least one output controller is individually programmable to change a state of the respective device actuation signals in response to reaching selected position values; and wherein one of the output controllers is programmable to change a state of a respective device actuation signal when a first sample of position data indicates a predetermined speed of travel through the production field and to change a state again if a second sample of position data indicates a speed of travel slower than the predetermined speed of travel.

* * * * *